US012771801B2

(12) United States Patent
Tajima et al.

(10) Patent No.: US 12,771,801 B2
(45) Date of Patent: Oct. 20, 2026

(54) INFORMATION PROCESSING APPARATUS, INFORMATION PROCESSING METHOD, AND NON-TRANSITORY RECORDING MEDIUM

(71) Applicants: Saki Tajima, Kanagawa (JP); Masayuki Tsuchiya, Tokyo (JP); Kazushige Ohnishi, Kanagawa (JP); Jun Hitosugi, Tokyo (JP)

(72) Inventors: Saki Tajima, Kanagawa (JP); Masayuki Tsuchiya, Tokyo (JP); Kazushige Ohnishi, Kanagawa (JP); Jun Hitosugi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 112 days.

(21) Appl. No.: 18/912,637

(22) Filed: Oct. 11, 2024

(65) Prior Publication Data

US 2025/0133179 A1 Apr. 24, 2025

(30) Foreign Application Priority Data

Oct. 23, 2023 (JP) ................................ 2023-182098
Jul. 3, 2024 (JP) ................................ 2024-107570

(51) Int. Cl.
*H04N 1/60* (2006.01)
*G01N 21/57* (2006.01)
*H04N 1/54* (2006.01)

(52) U.S. Cl.
CPC .......... *H04N 1/6097* (2013.01); *G01N 21/57* (2013.01); *H04N 1/54* (2013.01); *G03G 2215/0081* (2013.01)

(58) Field of Classification Search
CPC .................. H04N 1/54; H04N 1/6097; G03G 2215/0081; G01N 21/57
See application file for complete search history.

(56) References Cited

U.S. PATENT DOCUMENTS 8,634,108 B2 * 1/2014 Kojima ................. G01N 21/57 358/468
2011/0234660 A1 * 9/2011 Yoshida ................ B41J 2/2107 347/9
2015/0213342 A1 * 7/2015 Fukamachi .......... H04N 1/6097 358/1.9
2015/0370206 A1 12/2015 Hitosugi et al.
2016/0170321 A1 6/2016 Komori et al.
2017/0064151 A1 * 3/2017 Nagai ................. H04N 1/4072
2019/0182410 A1 6/2019 Takaya
2021/0297545 A1 9/2021 Ohnishi et al.

FOREIGN PATENT DOCUMENTS

JP 2010-020578 A 1/2010
JP 2019-104240 A 6/2019

* cited by examiner

*Primary Examiner* — Fred Guillermety
(74) *Attorney, Agent, or Firm* — XSENSUS LLP

(57) ABSTRACT

An information processing apparatus includes circuitry to acquire color information indicating a surface color of an image forming medium, set, based on the acquired color information, an image forming color for applying gloss to the image forming medium, and output an instruction to form an image on the image forming medium with the image forming color.

17 Claims, 27 Drawing Sheets

FIG. 1A
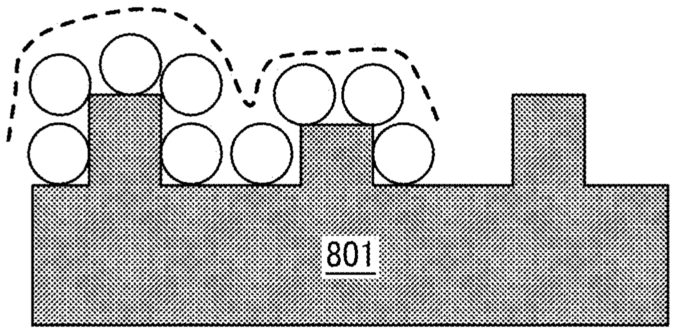
FIG. 1B
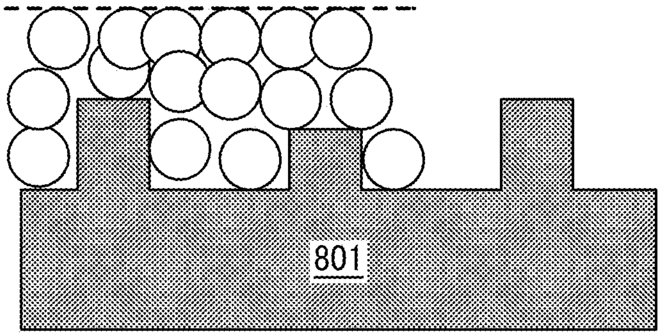
FIG. 2
| | | AMOUNT OF CLEAR TONER | |
|---|---|---|---|
| | | LARGE | SMALL |
| SURFACE PROPERTIES | ROUGH | CLOUDINESS: MEDIUM | CLOUDINESS: HIGH |
| | SMOOTH | CLOUDINESS: LOW | CLOUDINESS: MEDIUM |

FIG. 3

| | | MEDIUM COLOR | | FILM, CELLOPHANE | |
|---|---|---|---|---|---|
| | | COLORED | WHITE | COLORLESS AND TRANSPARENT | COLORED AND TRANSPARENT |
| SURFACE PROPERTIES | ROUGH | CLOUDY | TRANS-PARENT | NEARLY TRANSPARENT | SLIGHTLY CLOUDY |
| | SMOOTH | CLOUDY | TRANS-PARENT | NEARLY TRANSPARENT | SLIGHTLY CLOUDY |

FIG. 5

| | | MEDIUM COLOR | | | FILM, CELLOPHANE |
|---|---|---|---|---|---|
| | | COLORS PRODUCIBLE WITH CMYK TONER | WHITE | COLORS UNACHIEVABLE WITH CMYK TONER (SPECIAL COLORS) | |
| SURFACE PROPERTIES | ROUGH | POSSIBLE | POSSIBLE | POSSIBLE IF SPECIAL COLOR TONER MATCHES OR CLOSELY MATCHES MEDIUM COLOR | IMPOSSIBLE TO PRODUCE TRANSPARENCY WITH ANYTHING OTHER THAN CLEAR TONER |
| | SMOOTH | POSSIBLE | POSSIBLE | POSSIBLE IF SPECIAL COLOR TONER MATCHES OR CLOSELY MATCHES MEDIUM COLOR | IMPOSSIBLE TO PRODUCE TRANSPARENCY WITH ANYTHING OTHER THAN CLEAR TONER |

INFORMATION PROCESSING APPARATUS, INFORMATION PROCESSING METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application Nos. 2023-182098, filed on Oct. 23, 2023, and 2024-107570, filed on Jul. 3, 2024, in the Japan Patent Office, the entire disclosure of which is hereby incorporated by reference herein.

BACKGROUND

Technical Field

The present disclosure relates to an information processing apparatus, an information processing method, and a non-transitory recording medium.

Related Art

A technique for forming a glossy image on an image forming medium is known. For example, a print control apparatus transmits a job to a printing apparatus so that the printing apparatus, which received the job, performs printing using multiple colors of toner and a special color of toner for glossiness adjustment. The job includes data for printing a special color toner page to be printed using a special color of toner and a color toner page other than the special color toner page on the same side of the same sheet in a superimposed manner.

SUMMARY

In one aspect, an information processing apparatus includes circuitry to acquire color information indicating a surface color of an image forming medium, set, based on the acquired color information, an image forming color for applying gloss to the image forming medium, and output an instruction to form an image on the image forming medium with the image forming color.

In one aspect, an information processing method includes acquiring color information indicating a surface color of an image forming medium, setting, based on the acquired color information, an image forming color for applying gloss to the image forming medium, and outputting an instruction to form an image on the image forming medium with the image forming color.

In one aspect, a non-transitory recording medium storing a plurality of instructions which, when executed by one or more processors, causes the processors to perform the above-described method.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 1A and 1B are diagrams illustrating how cloudiness is caused by an image forming medium;

FIG. 2 is a diagram illustrating an example of a relationship among surface properties of an image forming medium, an amount of toner, and cloudiness;

FIG. 3 is a diagram illustrating an example of a relationship between surface properties and a surface color of an image forming medium and cloudiness;

FIG. 5 is a diagram illustrating an example of a relationship between surface properties and a surface color of an image forming medium and a pseudo-clear function;

Figure 4A:
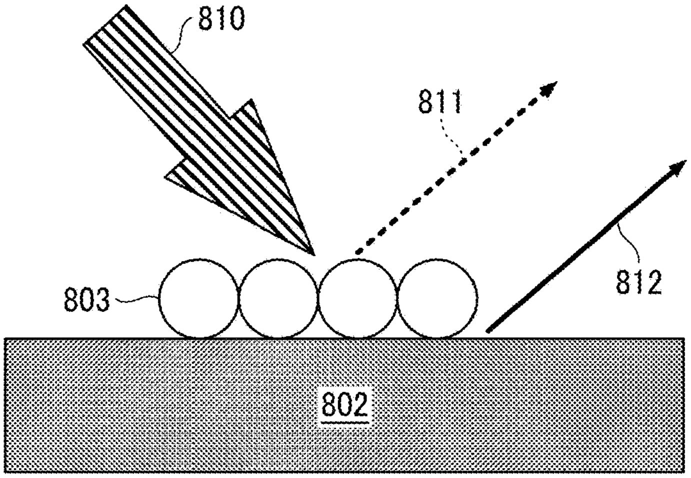
FIGS. 4A to 4C are diagrams illustrating the principle of a pseudo-clear function.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described in detail below with reference to the drawings. In the drawings, the same elements are denoted by the same reference numerals, and redundant descriptions thereof are omitted in the following description.

First Embodiment

A first embodiment of the present disclosure is an image forming system for forming an image on an image forming medium. The image forming medium is a medium on which an image is to be formed or an image is formed. The image forming system according to the present embodiment has a function of forming a glossy image that is an image to which gloss is applied.

In the present embodiment, the "gloss" may be specular gloss defined by Japanese Industrial Standards (JIS) "Specular glossiness-Methods of Measurement" (JIS Z 8741-1997). In the present specification, the "60° gloss" is used as a representative of the gloss.

Various techniques have been proposed for applying gloss to an image in an image forming apparatus. For example, as a technique, clear toner or clear ink is used to form a glossy image. Clear toner or clear ink is a type of toner or ink for printing in a transparent color. In the following description, the term "clear toner" includes clear ink.

When clear toner is used to apply gloss to an image, sufficient glossiness may not be obtained. For example, when an image is formed on a colored image forming medium using clear toner, an image with cloudiness may be formed. One of the factors causing the cloudiness is that the clear toner layer is not uniformly formed due to the influence of the cross-sectional structure of the colored image forming medium. Such a cloudy image gives the perception of low transparency to the human eye, and the glossiness of the image is reduced. On the other hand, when an image is formed on a white image forming medium using clear toner, even if cloudiness appears, the colors blend together, preventing a reduction in glossiness.

Examples of colored image forming medium include colored paper, corrugated cardboard, plastic, fabric, and woven fabric. The colored paper includes colored drawing paper manufactured by adding a coloring agent to a raw material. Examples of white image forming medium include plain paper and high-quality paper.

Further, the colored image forming medium may not be formed to have a uniform surface color. The surface color is a color of a surface of a medium. The colored image forming medium may have a partially different surface color. The image forming medium having a partially different surface color may be, for example, an image forming medium having a surface colored in a striped pattern, a polka-dot pattern, or a checkered pattern.

The term "colored" refers to a color that can be produced by toner or ink to have the same or substantially the same color as the background color, and includes white. This is because the ground color can be reproduced by using white toner or white ink.

A reason why cloudiness appears when an image is formed on a colored image forming medium using clear toner is related to an image forming medium, and another reason is related to toner.

The factor related to an image forming medium will be described below. FIGS. 1A and 1B are diagrams illustrating how cloudiness is caused by an image forming medium. FIG. 1A is a diagram illustrating an example of a state in which a small amount of toner is applied to an image forming medium having a rough surface. FIG. 1B is a diagram illustrating an example of a state in which a large amount of toner is applied to an image forming medium having a rough surface.

Basically, when a solid image is output by an image forming apparatus, the entire surface of an image forming medium is filled with the toner. However, as illustrated in FIGS. 1A and 1B, on an image forming medium 801 having a rough surface (uneven surface), the unevenness appears on the surface of the toner. In particular, as illustrated in FIG. 1A, in a state where a small amount of toner is applied to the image forming medium 801 having a rough surface, gaps are formed between the uneven areas, and thus light is reflected or scattered by the gaps, and the reflected light or scattered light looks whitish to the human eye. As illustrated in FIG. 1B, when a large amount of toner is applied, the gaps between the uneven areas becomes small, and the cloudiness is reduced accordingly.

The factor related to the toner will be described below. As described above, the image forming medium having a rough surface causes cloudiness, and even the colored image forming medium having a highly smooth surface causes cloudiness to some extent. The reason why the clear toner looks white is that light of all visible wavelengths is reflected or scattered inside the toner and the reflected light or scattered light looks whitish to the human eye.

On the other hand, when the toner is colored in CMYK, only light of a part of wavelengths which is not absorbed in the scattered light is reflected. The reflected light has substantially the same wavelength as the reflected light from the image forming medium, and does not look white. That is, whether the toner is colored or white, the toner reflects or scatters light, but when the toner is colored, the toner blends with the reflected light from the image forming medium, making it invisible to the human eye.

FIG. 2 is a diagram illustrating an example of a relationship among surface properties of an image forming medium, an amount of toner, and cloudiness.

As illustrated in FIG. 2, when a large amount of clear toner is applied to an image forming medium having a rough surface, the level of cloudiness is medium. On the other hand, when a small amount of clear toner is applied to an image forming medium having a rough surface, the level of cloudiness is large. In contrast, when a large amount of clear toner is applied to an image forming medium having a smooth surface, the level of cloudiness is low. On the other hand, when a small amount of clear toner is applied to an image forming medium having a smooth surface, the level of the cloudiness is medium.

FIG. 3 is a diagram illustrating an example of the relationship between surface properties, a surface color of an image forming medium, and cloudiness. As illustrated in FIG. 3, when the clear toner is applied to a colored image forming medium having a rough surface, cloudiness appears. On the other hand, when the clear toner is applied to a white image forming medium having a rough surface, cloudiness does not appear and the image looks transparent. Further, when the clear toner is applied to a colorless transparent image forming medium (for example, film, cellophane) having a rough surface, cloudiness slightly appears, and the image looks substantially transparent. On the other hand, when the clear toner is applied to a colored transparent image forming medium (for example, film, cellophane) having a rough surface, cloudiness slightly appears. The same applies to the case of an image forming medium having a smooth surface as well as a medium having a rough surface.

If the colorless transparent film and the clear toner have exactly the same light reflectance, the film and the clear toner can reflect the same light and thus the image looks transparent. However, in reality, the reflectance of the colorless transparent film is not exactly the same as that of the clear toner, and thus the image looks slightly white or colored.

An object of an embodiment of the present disclosure is to form an image with a high glossiness. In the present embodiment, an image is formed with substantially the same color as the surface color of the image forming medium, thereby forming a glossy image. When the image forming medium and the image have substantially the same color, the colors are blended and the image is seen through, and thus the glossiness of the image can be enhanced. In the following description, the function of forming an image in substantially the same color as an image forming medium is also referred to as "pseudo-clear function". On the other hand, the function of applying gloss using the clear toner is also referred to as "clear function". In the following description, the toner or the ink may be referred to as developer. In the following description, "substantially the same" may be expressed as "the same (identical)".

For example, when the difference between the values of C, M, Y, and K of the surface color of an image forming medium and the values of C, M, Y, and K of an image forming color is within a predetermined range, the surface color and the image forming color may be described as the same (identical). Further, when the difference between the values of one or more components of C, M, Y, and K of the surface color of an image forming medium and the values of one or more components of C, M, Y, and K of an image forming color is within a predetermined range, even if the values of other components are out of the predetermined range, the surface color and the image forming color may be described as the same (identical)

Figure 4B:
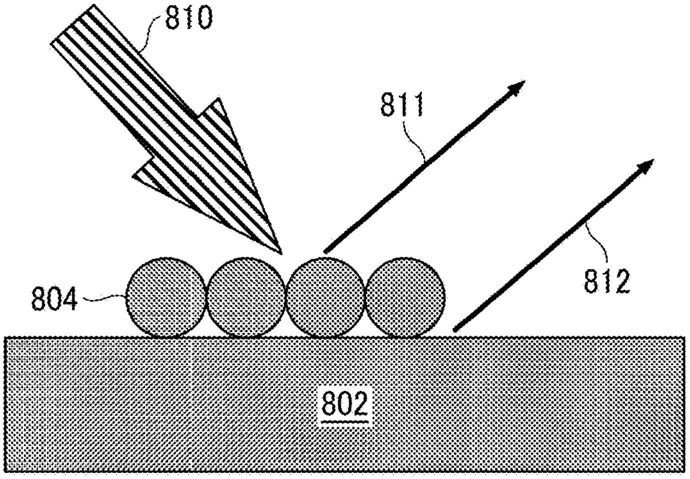
Figure 4C:
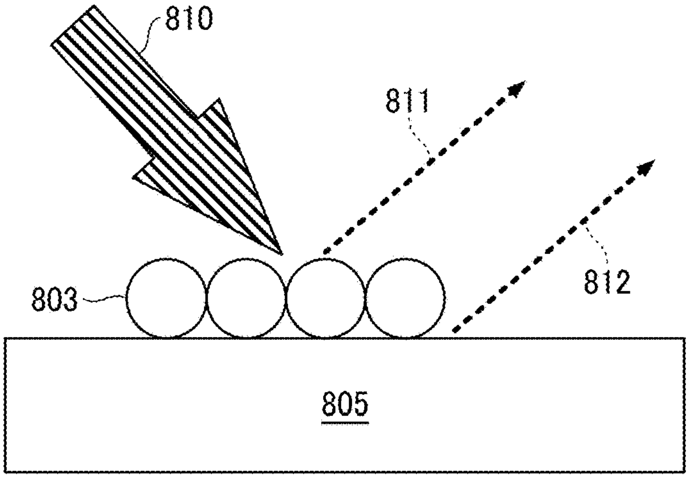

FIGS. 4A to 4C are diagrams illustrating the principle of a pseudo-clear function. FIG. 4A is a diagram illustrating an example of a state in which white toner is applied to a colored image forming medium. FIG. 4B is a diagram illustrating an example of a state in which toner of substantially the same color is applied to a colored image forming medium. FIG. 4C is a diagram illustrating an example of a state in which white toner is applied to a white image forming medium.

As illustrated in FIG. 4A, when white toner 803 is applied to a colored image forming medium 802, a reflected light 812 obtained by the white toner 803 reflecting a natural light 810 is white, and a reflected light 811 obtained by the image forming medium 802 reflecting the natural light 810 is the color of the image forming medium 802. In this case, the reflected light 811 and the reflected light 812 have different colors, and thus the reflected light 811 appears white to the human eye.

On the other hand, as illustrated in FIG. 4B, when toner 804 of substantially the same color is applied to the colored image forming medium 802, the reflected light 811 obtained by the toner 804 reflecting the natural light 810 has the color of the image forming medium 802, and the reflected light 812 obtained by the image forming medium 802 reflecting the natural light 810 has the color of the image forming medium 802. In this case, the reflected light 811 and the reflected light 812 have substantially the same color, and thus appear transparent to the human eye.

Similarly, as illustrated in FIG. 4C, when the white toner 803 is applied to a white image forming medium 805, the reflected light 811 obtained by the toner 803 reflecting the natural light 810 is white, and the reflected light 812 obtained by the image forming medium 805 reflecting the natural light 810 is white. In this case, the reflected light 811 and the reflected light 812 have substantially the same color, and thus appear transparent to the human eye.

FIG. 5 is a diagram illustrating an example of the relationship between surface properties, a surface color of image forming medium, a pseudo-clear function. As illustrated in FIG. 5, the pseudo-clear function can apply gloss to the image forming medium having a color producible by the CMYK toners among the image forming media having rough surfaces. Further, even in the case of a white image forming medium, gloss can be applied by the pseudo-clear function. Further, even in the case of an image forming medium having a color that is not producible by the CMYK toner, the pseudo-clear function using special color toner that is the same or substantially the same as the surface color of the image forming medium can achieve to apply gloss to an image formed on the image forming medium. In the case of an image forming medium having a smooth surface, the same applies to an image forming medium having a rough surface.

On the other hand, in the case of a colorless transparent or colored transparent image forming medium such as a film or cellophane, it is not possible to apply gloss by the pseudo-clear function. This is because the colored toner, unlike the clear toner, fails to produce colorless transparent or colored transparent results.

In one aspect, according to the present embodiment, it is possible to produce a printed material on which an image with sufficient glossiness is formed using an image forming apparatus that does not include clear toner. In another aspect, according to the present embodiment, it is possible to produce a printed material with rich expressiveness by using an image forming apparatus including clear toner can be proceed. In such a printed material, an area where a glossy image is formed and an area where a cloudy image is formed are mixed.

Overall Configuration of Image Forming System

Figure 6:
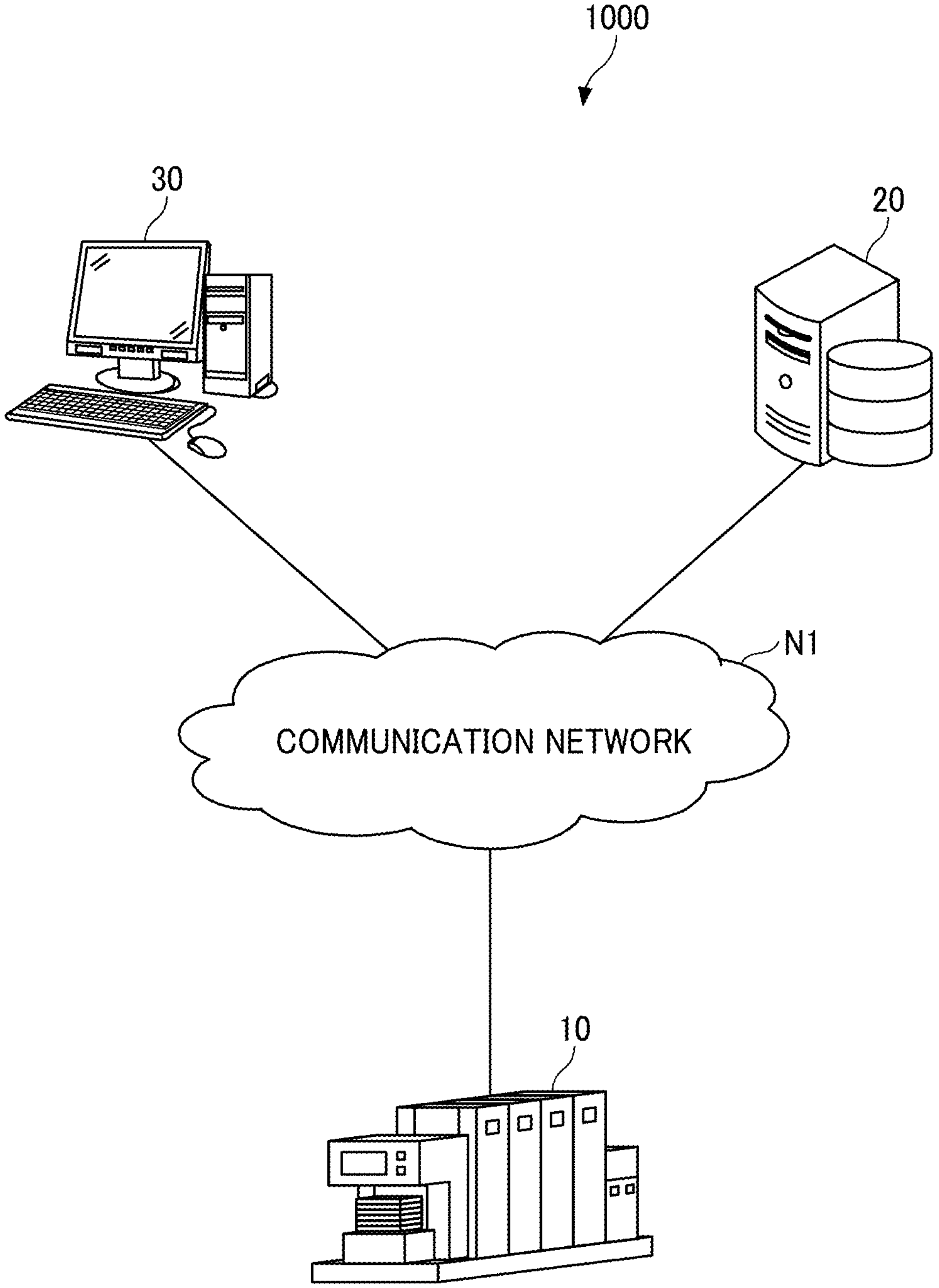
FIG. 6 is a diagram schematically illustrating an example of an overall configuration of an image forming system according to some embodiments of the present disclosure.

The overall configuration of the image forming system according to the present embodiment will be described with reference to FIG. 6. FIG. 6 is a diagram schematically illustrating an example of the overall configuration of an image forming system 1000 according to an embodiment.

As illustrated in FIG. 6, the image forming system 1000 includes an image forming apparatus 10, a print control apparatus 20, and a terminal device 30. The image forming apparatus 10, the print control apparatus 20, and the terminal device 30 are connected to a communication network N1. The connected devices can communicate with each other through the communication network N1.

The communication network N1 is, for example, a wired communication network such as the Internet, a local area network (LAN), or a wide area network (WAN). The communication network N1 may include, in addition to wired communication, a network based on wireless communication such as wireless LAN or short-range wireless communication, or mobile communication such as worldwide interoperability for microwave access (WiMAX), long term evolution (LTE), or 5th generation (5G).

The image forming apparatus 10 is an example of an image forming apparatus that forms an image on an image forming medium. The image forming apparatus 10 may be an electrostatic recording apparatus that applies toner to a print sheet, which is an example of an image forming medium, by the action of static electricity. The image forming apparatus 10 may be a liquid ejecting apparatus that discharges liquid such as ink to apply the liquid to a print sheet. The image forming apparatus 10 may be, for example, a laser printer, an inkjet printer, or an electrostatic copier.

The image forming apparatus 10 forms an image on an image forming medium in accordance with an image forming job. The image forming job may include image data, medium information, and setting information. The image data is electronic data representing an image to be formed on an image forming medium. The image data may be data in which characters and/or images are/is laid out. The medium information is information indicating a type of image forming medium. The setting information is information indicating settings such as color (monochrome or color, etc.), image forming surface (single-sided or double-sided, etc.), the number of copies, and magnification.

The image forming job may be input from the print control apparatus 20 to the image forming apparatus 10 by an operation performed on the print control apparatus 20. The image forming job may be input to the image forming apparatus 10 by an operation performed on an operation panel of the image forming apparatus 10.

The print control apparatus 20 is an example of an information processing apparatus that spools an image forming job and transmits the image forming job to the image forming apparatus 10 in accordance with a job scheduler. The print control apparatus 20 may be a computer such as a personal computer, a workstation, or a server. Software called a digital front end (DFE) may be installed on the print control apparatus 20 in advance.

The print control apparatus 20 receives an image forming instruction from the terminal device 30 and generates an image forming job based on the image forming instruction. The print control apparatus 20 stores image forming jobs in a spool, and transmits an image forming job read from the spool to the image forming apparatus 10 in accordance with the job execution status of the image forming apparatus 10.

The terminal device 30 is an example of an information processing terminal operated by a user. The terminal device 30 may be a computer such as a personal computer, a smartphone, or a tablet terminal. Software with which an image can be generated, such as image editing software, may be installed in advance on the terminal device 30.

The terminal device 30 acquires an image to be formed on an image forming medium in response to a user operation. The terminal device 30 transmits an image forming instruction including the image to the print control apparatus 20 in response to a user operation.

The print control apparatus 20 and the terminal device 30 are not limited to information processing apparatuses, and any apparatuses that have communication functions may be used. The print control apparatus 20 or the terminal device 30 includes an output device such as a Projector (PJ), an Interactive White Board (a white board having an electronic whiteboard function capable of mutual communication (IWB)), and a digital signage, a Head Up Display (HUD) device, an industrial machine, an imaging device, a sound collecting device, a medical device, a network home appliance, an automobile (connected car), a notebook Personal Computer (PC), a mobile phone, a smartphone, a tablet terminal, a game console, a Personal Digital Assistant (PDA), a digital camera, a wearable PC, or a desktop PC.

The overall configuration of the image forming system 1000 illustrated in FIG. 6 is an example, and various system configuration examples are possible according to the application and purpose. For example, the image forming system 1000 may include multiple image forming apparatuses 10, multiple print control apparatuses 20, and/or multiple terminal devices 30. For example, the print control apparatus 20 may be implemented by multiple computers or may be implemented as a cloud computing service. The device classification such as the image forming apparatus 10, the print control apparatus 20, and the terminal device 30 illustrated in FIG. 6 is an example.

Hardware Configuration of Image Forming System

The hardware configuration of the image forming system 1000 will be described with reference to FIGS. 7 to 14.

Laser Printer

Figure 7:
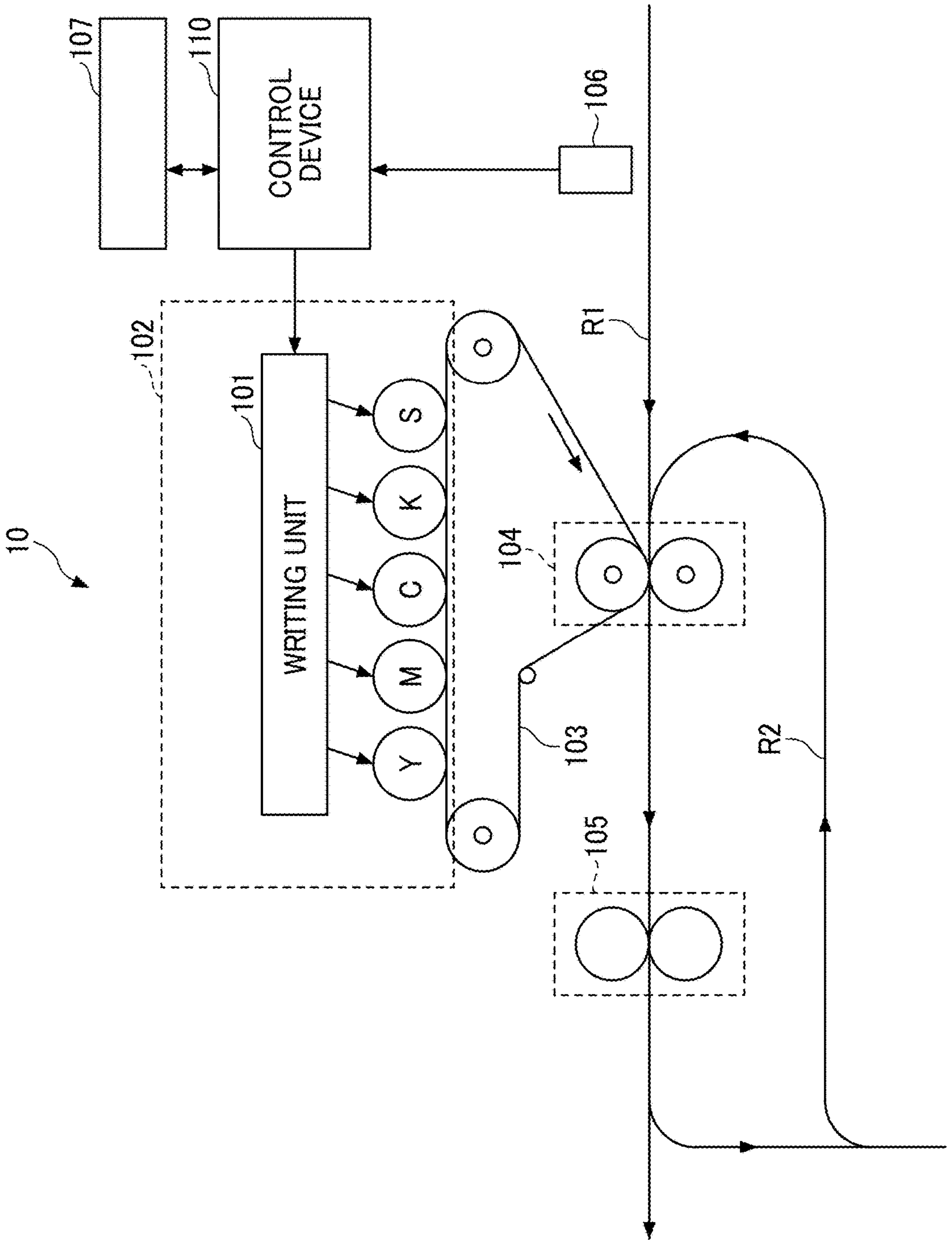
FIG. 7 is a diagram schematically illustrating an example of a part of a laser printer according to some embodiments of the present disclosure.

A hardware configuration of a laser printer as an example of the image forming apparatus 10 will be described with reference to FIGS. 7 and 8. FIG. 7 is a diagram schematically illustrating an example of a part of a laser printer according to an embodiment.

As illustrated in FIG. 7, the image forming apparatus 10 includes a writing unit 101, an image forming unit 102, an intermediate transfer belt 103, a secondary transfer unit 104, a fixing unit 105, a colorimeter 106, a display 107, and a control device 110.

The writing unit 101 forms a transfer image (toner image) on the image forming unit 102 by laser light.

The image forming unit 102 holds the photoconductor, the developer, and the toner, and forms a toner image by the laser light from the writing unit 101. The image forming unit 102 includes photosensitive drums Y (yellow), M (magenta), C (cyan), K (key plate, black), and S (special color). The image forming unit 102 performs an image forming process (a charging step, an exposure step, and a developing step) to form a toner image on each of the photosensitive drums Y, M, C, K, and S. The toner images formed on the photosensitive drums Y, M, C, K, and S are transferred to the intermediate transfer belt 103 in a transfer process. After the toner image is transferred, the image forming unit 102 performs a cleaning process to clean the intermediate transfer belt 103 and prepare for the next image forming process.

The special color is a generic term for colors different from any of yellow, magenta, cyan, and black, and includes transparent colors. In the present embodiment, the photosensitive drum S is filled with the clear toner.

When a full-color toner image is formed, the image forming unit 102 sequentially forms a yellow toner image, a magenta toner image, a cyan toner image, and a black toner image, superimposes the toner images to obtain a superimposed toner image, and transfers the superimposed toner image to the intermediate transfer belt 103. When forming a glossy image, the image forming unit 102 transfers the clear toner image to the intermediate transfer belt 103. The image forming unit 102 forms a yellow toner image, a magenta toner image, a cyan toner image, a black toner image, and a clear toner image on the photosensitive drums Y, M, C, K, and S, respectively.

The transfer of the toner images from the photosensitive drums Y, M, C, K, and S to the intermediate transfer belt 103 is primary transfer, and the transfer from the intermediate transfer belt 103 to a print sheet is secondary transfer. The image forming unit 102 conveys the toner image (full-color toner image) obtained by superimposing the toner images transferred from the photosensitive drums Y, M, C, K, and S to the intermediate transfer belt 103 to the position of the secondary transfer unit 104 (secondary transfer position). The secondary transfer position is a position where the secondary transfer roller and a conveyance path R1 or R2 are in contact. R1 is a conveyance path for single-sided printing, and R2 is a conveyance path for double-sided printing.

The secondary transfer unit 104 collectively transfers (secondarily transfers) the full-color toner image transferred to the intermediate transfer belt 103 to a print sheet at a secondary transfer position.

The fixing unit 105 fixes the toner image to the print sheet by heating and pressing the print sheet to which the toner image has been transferred, using a pair of rollers.

The colorimeter 106 is a measuring device that measures the surface color of the print sheet conveyed on the conveyance path R1 or R2. The colorimeter 106 may employ a spectrophotometric method. The color information indicating the surface color of a print sheet measured by the colorimeter 106 is input to the control device 110.

The colorimeter 106 may be installed outside the image forming apparatus 10. For example, the colorimeter 106 may be installed in a paper feed unit that supplies print sheets to the image forming apparatus 10. Further, for example, the colorimeter 106 may be an external device connected to the image forming apparatus 10.

The display 107 is an example of a display device. The control device 110 controls the overall operation of the image forming apparatus 10. The control device 110 converts image data transmitted from the host device into a format (transfer image) with which the writing unit 101 can form an image. The control device 110 executes a predetermined image forming process based on, for example, an image forming job input from an external device such as the print control apparatus 20.

A hardware configuration of the control device 110 will be described with reference to FIG. 8. FIG. 8 is a block diagram illustrating an example of a hardware configuration of a control device according to an embodiment.

Figure 8:
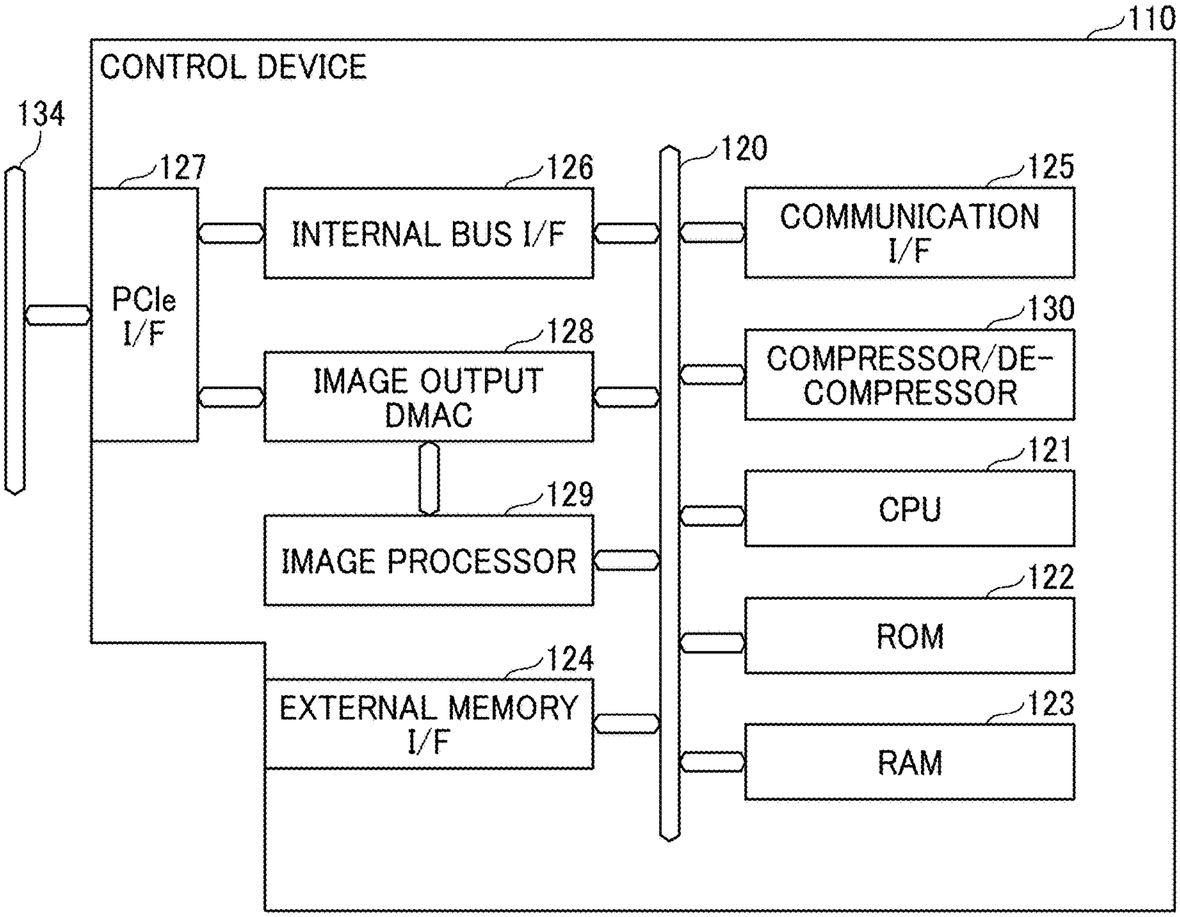
FIG. 8 is a block diagram illustrating an example of a hardware configuration of a control device according to some embodiments of the present disclosure.

As illustrated in FIG. 8, the control device 110 includes a central processing unit (CPU) 121, a read-only memory (ROM) 122, a random access memory (RAM) 123, an external memory interface (I/F) 124, a communication I/F 125, an internal bus I/F 126, a peripheral component interconnect express (PCIe) I/F 127, an image output direct memory access controller (DMAC) 128, an image processor 129, and a compressor/decompressor 130. The above-described components are connected to each other by an internal bus 120.

The internal bus 120 further connects each component to the PCIe bus 134 via the internal bus I/F 126 and the PCIe I/F 127.

The CPU 121 performs all settings related to the system by executing various arithmetic processing and activates the image output DMAC 128, the image processor 129, and the compressor/decompressor 130.

In the ROM 122, for example, an operation control program for the CPU 121 is stored. The RAM 123 is employed not only as a temporary storage location to store calculation results of the CPU 121 and various data, but also as a memory to store images. The ROM 122 and the RAM 123 are collectively referred to as an internal memory or internal memories unless the ROM 122 and the RAM 123 are distinguished from each other.

An image memory used as a memory for storing images is connected to the external memory I/F 124. When receiving the image data from the print control apparatus 20, the CPU 121 performs drawing on the image memory via the external memory I/F 124 based on a printer language.

The communication I/F 125 is an interface between the print control apparatus 20 and the control device 110.

The internal bus I/F 126 is an interface between the PCIe I/F 127 and the internal bus 120. The internal bus I/F 126 inputs and outputs an image between an address designated by the PCIe bus master and the image memory via the external memory I/F 124.

The PCIe I/F 127 performs data transmission and reception with the PCIe bus master in accordance with a protocol of the PCIe bus 134.

The image output DMAC 128 and the image processor 129 are connected to the CPU 121 and the external memory I/F 124 through the internal bus 120. The image output DMAC 128 is also connected to the PCIe I/F 127.

The image output DMAC 128 functions as a DMA controller when printing is performed. In other words, when the image output DMAC 128 is activated by the CPU 121, the image output DMAC 128 reads image data from an external memory in a predefined area and outputs the image data to the PCIe I/F 127. The above-described output is performed by an exchange of handshake at any time.

The image processor 129 corrects distortion of an image that has been read.

The compressor/decompressor 130 is activated by the CPU 121 and performs various compression or decompression. The compressor/decompressor 130 is used for memory saving.

Inkjet Recording Apparatus

Figure 9:
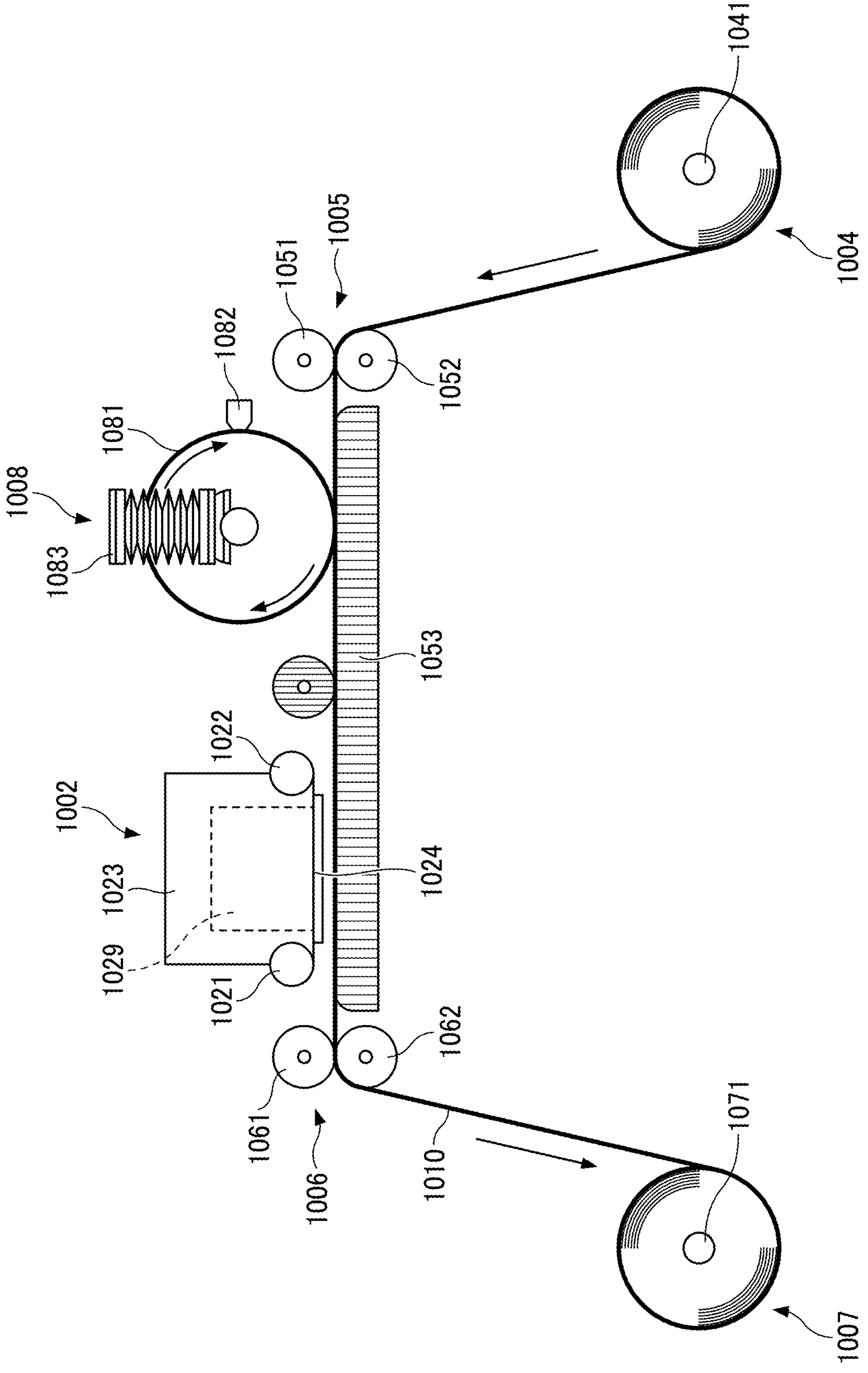
FIG. 9 is a side view of an inkjet recording apparatus according to some embodiments of the present disclosure.
Figure 10:
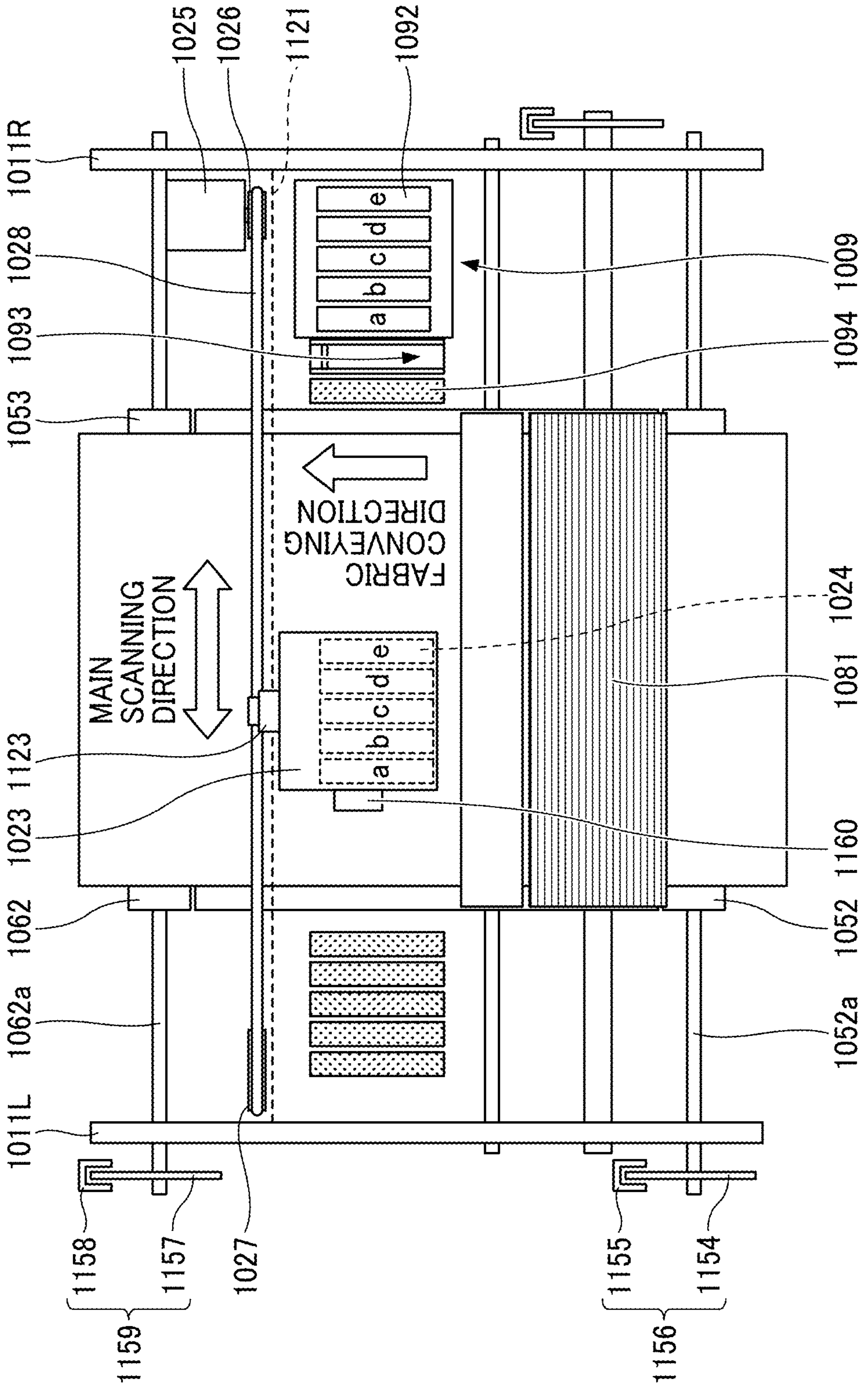
FIG. 10 is a bottom view of a part of an inkjet recording apparatus according to some embodiments of the present disclosure.

A hardware configuration of an inkjet recording apparatus, which is another example of the image forming apparatus 10, will be described with reference to FIGS. 9 to 13. The inkjet recording apparatus can be used when the image forming medium is, for example, plastic, fabric, or woven fabric. FIG. 9 is a side view of an inkjet recording apparatus according to an embodiment. FIG. 10 is a bottom view of a part of an inkjet recording apparatus according to an embodiment.

As illustrated in FIG. 9, the inkjet recording apparatus according to the present embodiment includes a conveyance unit for conveying fabric 1010, a recording unit 1002 for performing recording by discharging ink onto the fabric 1010 using an inkjet method, and a cleaning unit 1008 for cleaning the fabric 1010. The cleaning unit 1008 is provided on the upstream of the recording unit 1002 in the conveying direction of the fabric 1010, and cleans the fabric 1010 by electrostatic attraction action.

The inkjet recording apparatus according to the present embodiment is a serial type image forming apparatus, and includes the recording unit 1002 and conveyance mechanisms 1005 and 1006 inside the main body, and feeds the fabric 1010 on which printing is to be performed from a fabric feeding unit 1004 on a side of the main body. Then, while the fabric 1010 is intermittently conveyed in the horizontal direction by the conveyance mechanism 1005, dust and fibers on the surface of the fabric 1010 are removed by the cleaning unit 1008, and then, an image is recorded by discharging liquid droplets downward in the vertical direction by the recording unit 1002. Then, the fabric 1010 on which the image is recorded is delivered from the conveyance mechanism 1006 that is a fabric delivery unit 1006, and the fabric 1010 is wound and collected by a winding unit 1007.

In the present embodiment, regarding the recording unit 1002, a main guide 1021, a sub guide 1022, a carriage 1023, a recording head 1024, and a head tank 1029 are illustrated. The recording unit 1002 slidably holds the carriage 1023 on which the recording head 1024 is mounted by the main guide 1021 and the sub guide 1022 that are laterally bridged between left and right side plates 1011L and 1011R, and moves and scans in the main scanning direction by a main scanning motor 1025 via a timing belt 1028 stretched between a drive pulley 1026 and drive pulley 1027.

The carriage 1023 is mounted with recording heads 1024*a*, 1024*b*, 1024*c*, 1024*d*, and 1024*e* (referred to as "recording heads 1024" or "recording head 1024" unless distinguished) that are liquid ejection heads for discharging ink droplets of yellow (Y), magenta (M), cyan (C), black (K), and white (W), respectively, such that nozzle rows each including multiple nozzles are arranged in a sub-scanning direction perpendicular to the main scanning direction and the droplet discharge direction is directed downward in the vertical direction.

The liquid discharge head included in the recording head 1024 may be a pressure generating unit for generating a pressure for discharging liquid droplets, such as a piezoelectric actuator such as a piezoelectric element, a thermal actuator utilizing a phase change caused by film boiling of liquid by using an electrothermal transducer such as a heating resistor, a shape memory alloy actuator utilizing a metal phase change caused by a temperature change, or an electrostatic actuator utilizing an electrostatic force.

The carriage 1023 may also include a droplet discharge head that discharges a fixing liquid that reacts with ink to increase the fixability of the ink. The carriage 1023 is also provided with the head tank 1029 for supplying ink of each color to the corresponding nozzle array of the recording head 1024. The head tank 1029 is supplied with ink from an ink cartridge detachably mounted on the main body.

Figure 11:
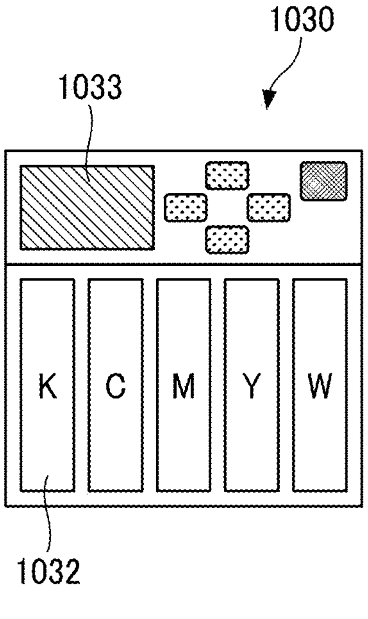
FIG. 11 is a diagram schematically illustrating an example of an ink cartridge.

FIG. 11 is a schematic view of an ink cartridge. An ink cartridge 1030 has ink tanks 1032 of respective colors, and yellow (Y), magenta (M), cyan (C), black (K), and white (W) are illustrated in FIG. 11, but the present disclosure is not necessarily limited to this, and can be appropriately changed. The ink cartridge 1030 is provided with a panel 1033 as appropriate.

Since the recording head 1024 discharges droplets in the vertically downward direction, it is preferable to form a negative pressure in order to prevent liquid dripping, and it is preferable that the head tank 1029 has a negative pressure maintaining function as well as a function as a buffer tank.

In the present embodiment, at least a part of the liquid chamber portion, the fluid resistance portion, the vibration plate, and the nozzle member of the recording head 1024 is preferably formed of a material containing at least one of stainless steel (SUS), silicon, and nickel.

Since SUS can cope with a wide range of liquid ink and has a high thermal conductivity, a head formed of a SUS member can be formed as a head having excellent temperature controllability. Further, when silicon is used, the semiconductor technology or the micro electro mechanical systems (MEMS) technology can be used for processing, and thus, very fine processing with high accuracy can be performed.

Regarding the nickel member, metal thin films can be manufactured by an electroforming technology, and a highly accurate shape can be formed. Nickel is easily dissolved by being acidified and has low ink adaptability. However, by electroforming with an alloy such as palladium, metal thin film components having high durability and excellent workability can be produced with nickel.

In addition, the nozzle diameter of the nozzle of the recording head 1024 is not limited, but is preferably 50 μm or less, and more preferably 10 μm to 30 μm.

An encoder scale 1121 with a predetermined pattern is stretched between both the side plates 1011L and 1011R along the main scanning direction of the carriage 1023, and the carriage 1023 is provided with an encoder sensor 1123 being a transmissive photosensor to read the pattern of the encoder scale 1121. The encoder scale 1121 and the encoder sensor 1123 together implement a linear encoder (a main scanning encoder) that detects the movement of the carriage 1023.

Further, a maintenance unit 1009 for maintaining and recovering the nozzles of the recording head 1024 is disposed in a non-printing area at one end in the scanning direction of the carriage 1023.

The maintenance unit 1009 includes caps 1092*a*, 1092*b*, 1092*c*, 1092*d*, and 1092*e* (collectively referred to as "caps 1092" or "cap 1092 unless distinguished) for capping the nozzle surfaces of the recording heads 1024, a wiper member (wiper blade) 1093 for wiping the nozzle surfaces, and a dummy discharge receiver 1094 for receiving droplets ejected during dummy discharge for discharging droplets that do not contribute to recording, in order to discharge thickened recording liquid (ink).

The maintenance and recovery of the nozzles of the recording head 1024 is performed by moving the carriage 1023 to a position, which is the home position, facing the maintenance unit 1009 performing capping with the cap 1092, performing suction and discharge from the nozzles, and performing nozzle suction. Further, by performing a maintenance and recovery operation such as dummy discharge for discharging liquid droplets that do not contribute to image forming, image forming by stable liquid droplet discharge can be performed.

The fabric 1010 for printing is wound around a feeding section paper tube 1041 of the fabric feeding unit 1004 and fed between upper and lower feeding rollers 1051 and 1052 of the conveyance mechanism 1005, and then fed out from between upper and lower delivery rollers 1061 and 1062 of the fabric delivery unit 1006 along a platen 1053. The sheet is fixed to a winding section sheet tube 1071 of the winding unit 1007, and is wound by rotating the winding section sheet tube 1071 by a motor.

A code wheel 1154 is mounted on a shaft 1052*a* of the feeding roller 1052, and an encoder sensor 1155 being a transmissive photosensor is disposed to detect a pattern of the code wheel 1154. The code wheel 1154 and the encoder sensor 1155 are included in a rotary encoder (feeding encoder) 1156 that detects the amount of rotation and the rotation angle of the feeding roller.

Similarly, a code wheel 1157 is mounted on a shaft 1062*a* of the delivery roller 1062, and an encoder sensor 1158 being a transmissive photosensor is disposed to detect a pattern of the code wheel 1157. The code wheel 1157 and the encoder sensor 1158 are included in a rotary encoder (delivery encoder) 1159 to detect the amount of rotation and the rotation angle of the delivery roller.

The amounts of rotation of the feeding rollers 1051 and 1052 and the delivery rollers 1061 and 1062 are controlled to be the same or the amount of the delivery rollers 1061 and 1062 is controlled to be slightly larger, so that tension is applied to the fabric 1010 on the platen 1053 in the conveying direction, thereby preventing the fabric 1010 from floating.

In the inkjet recording apparatus according to the present embodiment as described above, the fabric 1010 is horizontally fed from the fabric feeding unit 1004 by a conveyance amount corresponding to each scan. The inkjet recording apparatus drives the recording head 1024 in accordance with an image signal while moving the carriage 1023 to discharge ink droplets to the fabric 1010, which is stopped below the recording head 1024, to record one line, and after the fabric 1010 is conveyed by a predetermined amount, performs recording of another line, which is the next line. The fabric 1010 on which recording is completed is delivered from the fabric delivery unit 1006 and is wound by the winding unit 1007.

In the present embodiment, a charging drum 1081 (charging body), a charging unit 1082, and a charging body pressing unit 1083 are illustrated. The cleaning unit 1008 of the present embodiment is provided on the upstream of the recording unit 1002 in the conveying direction of the fabric 1010 and cleans the fabric 1010 by electrostatic attraction action. The cleaning unit 1008 includes at least the charging body that rotates while being in contact with or in the vicinity of the fabric 1010 and the charging unit 1082 that applies static electricity to the surface of the charging body. The charging body has at least an insulating layer 1201 that faces the fabric 1010. In the present embodiment, the charging drum 1081 is used as the charging body, but the charging body is not limited to this, and may be a belt such as an endless belt.

In the cleaning unit 1008, the charging drum 1081, which is a charging body, is pressed against the fabric 1010 by the charging body pressing unit 1083, and rotates in synchronization with the conveyance of the fabric 1010.

As a result, the surface of the charging drum 1081 and the fabric 1010 are synchronized, and the dust (adhered substances) on the surface of the fabric 1010 can be attracted to the surface of the charging drum 1081 and cleaned while being in contact (or in the vicinity). The charging drum 1081 is in contact with the charging unit 1082, which is a charging unit, and the charging unit 1082 can apply electrostatic charge to the surface for charging.

Figure 12A:
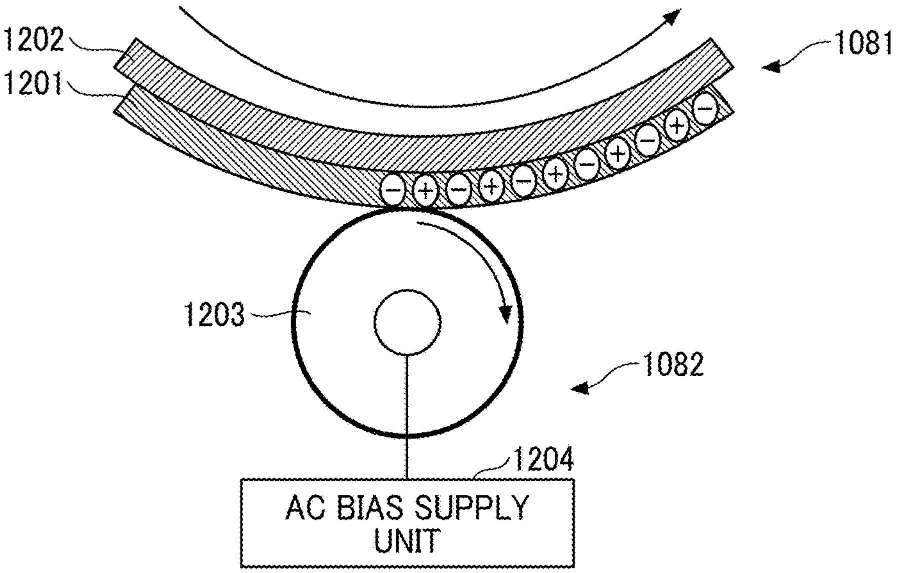
FIGS. 12A to 12C are diagrams schematically illustrating an example of a charging unit in a cleaning unit.
Figure 12B:
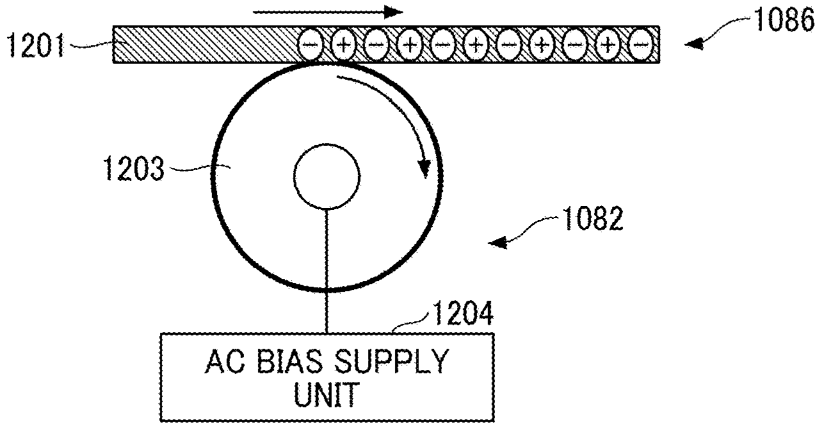
Figure 12C:
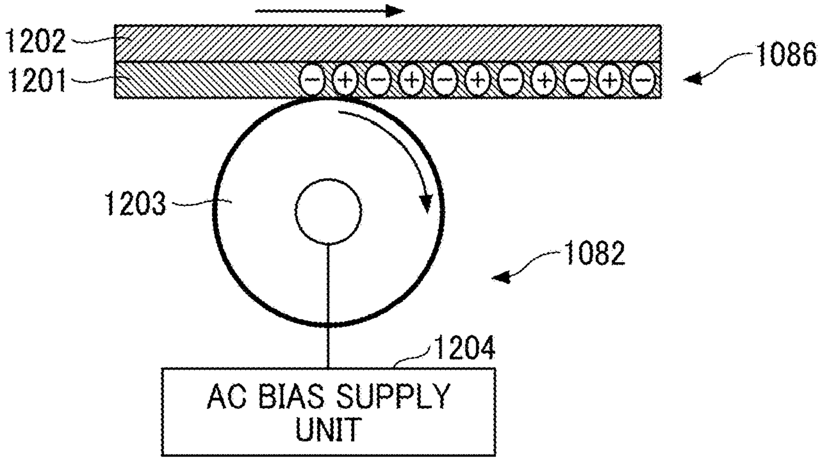

FIGS. 12A to 12C are schematic views each illustrating a charging unit in a cleaning unit. FIG. 12A illustrates an example of a configuration of the charging drum 1081. FIG. 12A schematically illustrates a cross section of the charging drum 1081, and illustrates a configuration example in which a conductive layer 1202 and the insulating layer 1201 are laminated. The charging unit 1082 includes a charging roller 1203 and an alternating current (AC) bias supply unit 1204 used for the charging roller 1203 to apply static electricity to the charging drum 1081. The charging roller 1203 rotates while being in contact with the charging drum 1081, and applies static electricity to the surface of the charging drum 1081.

In FIG. 12A, the charging drum 1081 has a two-layer structure, but the present embodiment is not limited thereto, and the charging drum 1081 may have a single-layer structure as long as the layer in contact with the charging unit 1082 is the insulating layer 1201. In another example, as illustrated in FIGS. 12B and 12C, the charging belt 1086 may be used in alternative to the charging drum 1081.

Examples of the material of the insulating layer 1201 include resins or elastomers such as polyethylene terephthalate (PET), polyetherimide (PEI), polyvinylidene fluoride (PVDF), polycarbonate (PC), tetrafluoroethylene-ethylene copolymer (ETFE), and polytetrafluoroethylene (PTFE). It is preferable that these materials do not contain a conductivity control material. The volume resistivity of the insulating layer 1201 is preferably 1012 Ωcm or more, and more preferably 1015 Ωcm or more.

The thickness of the insulating layer 1201 is preferably 20 to 100 μm.

As a material of the conductive layer 1202, for example, a material obtained by containing carbon in the resin or elastomer or a metal material can be used. The volume resistivity of the conductive layer 1202 is preferably 105 to 107 Ωcm. The thickness of the conductive layer 1202 is preferably 50 to 200 μm.

As illustrated in FIG. 12A, the charging roller 1203 is connected to the AC bias supply unit 1204 that applies an AC bias of, for example, 2 kV to 3 kV. The AC bias to be applied is preferably in the range of ±1.2 kV to ±4.0 kV, more preferably ±1.6 kV to ±2.4 kV. When the value of the AC bias is higher than the lower limit value, a sufficient attraction force is obtained, and the dust can be sufficiently removed. When the value of the AC bias is equal to or less than the upper limit value, the attraction to the fabric 1010 is not too strong, and the charging unit 1082 and the fabric 1010 can be smoothly peeled off after the dust removal. Further, residual charges can be made less likely to remain on the fabric 1010, and this prevents a decrease in landing position accuracy and the generation of mist due to the occurrence of bending of ink droplets due to the influence of residual charges.

As illustrated in FIG. 12A, the AC bias supplied to the charging roller 1203 can alternately charge the insulating layer 1201 of the charging drum 1081 with positive and negative charges in the moving direction of the charging drum 1081. The insulating layer 1201 of the charging drum 1081 to be charged positively and negatively preferably has a volume resistivity of 1012 Ωcm or more as described above, and more preferably 1015 Ωcm or more. When the insulating layer 1201 is formed as described above, the positive and negative charges charged in the insulating layer 1201 can be prevented from moving at the boundary, and the positive and negative charges can be alternately and stably charged in the insulating layer 1201.

When an instruction to output an image is given to the inkjet recording apparatus according to the present embodiment, the charging drum 1081 is rotated by the driving motor in synchronization with the conveyance speed of the fabric 1010, and at the same time, an AC bias is applied to the charging roller 1203 from the AC bias supply unit 1204.

Figure 13A:
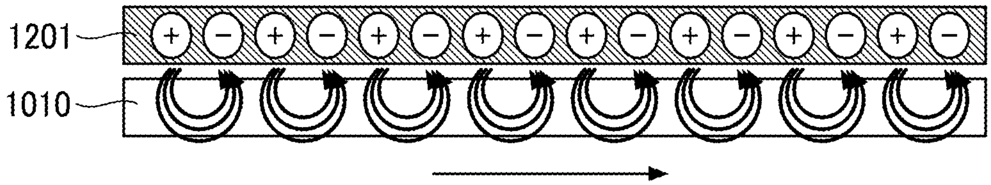
FIGS. 13A to 13C are diagrams schematically illustrating a portion where a cleaning unit comes into contact with fabric.
Figure 13B:
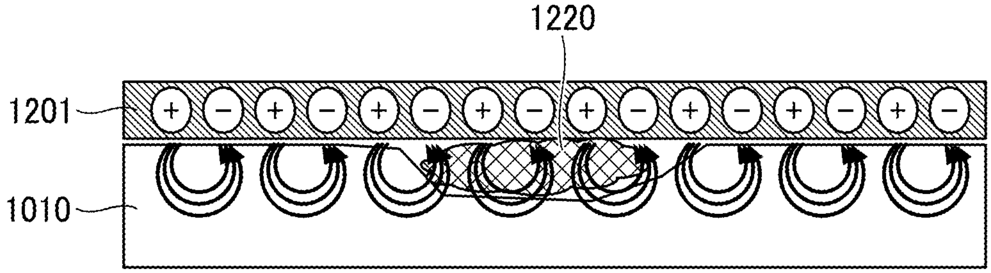
Figure 13C:
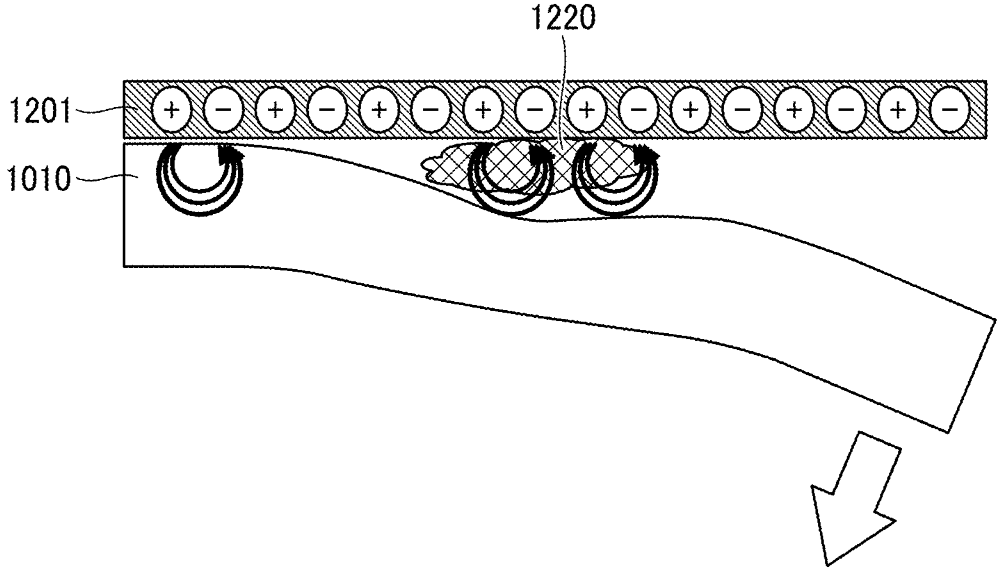

FIGS. 13A to 13C are schematic views each illustrating a portion where a cleaning unit comes into contact with fabric. As illustrated in FIG. 13A, the insulating layer 1201 of the charging drum 1081 is charged alternately with positive and negative charges in the moving direction of the charging drum 1081 by the charging roller 1203 and the AC bias supply unit 1204. Then, a minute electric field as indicated by arc-shaped arrows in FIG. 13A is generated on the surface of the charging drum 1081. The fabric 1010 is attracted to the charging drum 1081 in which the minute electric field is generated, and the electrostatic force on the charging drum 1081 acts on the fibers on the fabric 1010, and the fibers of the fabric 1010 are attracted to the charging drum 1081.

In order to cause the fibers of the fabric 1010 to be attracted to the charging drum 1081 as described above, it is preferable that the position at which the charging roller 1203 comes into contact with the charging drum 1081 is in the vicinity of the position at which the charging drum 1081 and the fabric 1010 come into contact or are in the vicinity thereof, and is on the upstream of the position at which the charging drum 1081 and the fabric 1010 come into contact or are in the vicinity thereof. That is, the charging roller 1203 preferably applies static electricity to the charging drum 1081 on the immediately upstream in the rotation direction of the charging drum 1081 from the position where the fabric 1010 and the charging drum 1081 are in contact with each other or in the vicinity thereof. With such a configuration, a minute electric field can be reliably generated on the surface of the charging drum 1081 at a position where the fabric 1010 and the charging drum 1081 come into contact with each other, and the fabric 1010 can be stably attracted to the charging drum 1081.

When there is dust 1220 (adhered substances) on the fabric 1010, as illustrated in FIG. 13B, the charging drum 1081 and the dust 1220 come into contact, and both the fabric 1010 and the dust 1220 are attracted to the charging drum 1081 by the electrostatic force on the surface of the charging drum 1081. Thern, when the fabric 1010 is separated from the charging drum 1081, as illustrated in FIG. 13C, the dust 1220 on the surface of the fabric 1010 is attracted to the charging drum 1081, and the dust 1220 can be removed from the fabric 1010.

Computer

Figure 14:
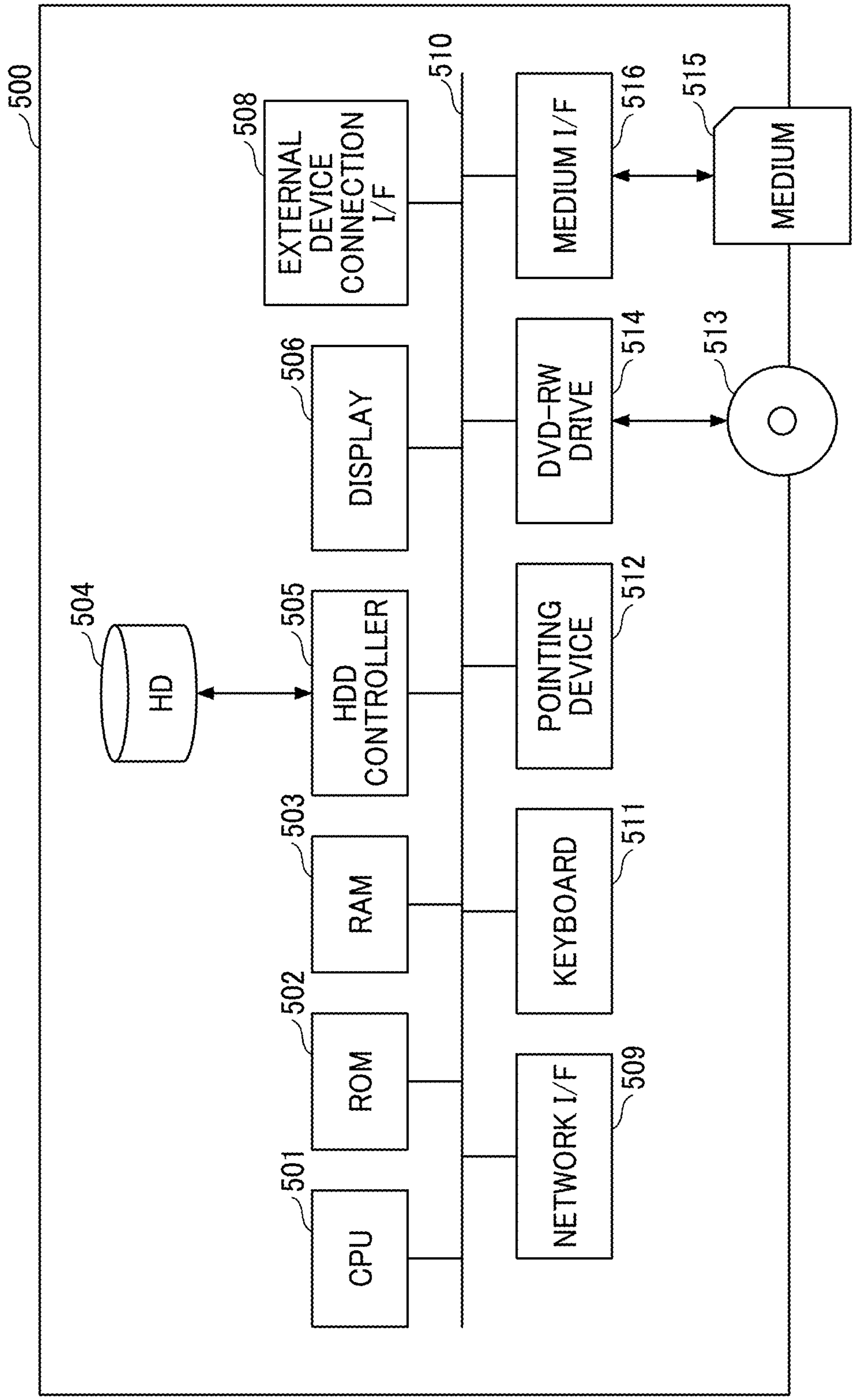
FIG. 14 is a block diagram illustrating an example of a hardware configuration of a computer according to some embodiments of the present disclosure.

Each of the print control apparatus 20 and the terminal device 30 may be implemented by a computer. FIG. 14 is a block diagram illustrating an example of a hardware configuration of a computer according to an embodiment.

As illustrated in FIG. 14, the computer 500 includes CPU 501, ROM 502, RAM 503, a hard disk (HD) 504, a hard disk drive (HDD) controller 505, a display 506, an external device connection I/F 508, a network I/F 509, a bus line 510, a keyboard 511, a pointing device 512, a digital versatile disk rewritable (DVD-RW) drive 514, and a medium I/F 516.

The CPU 501 controls the entire operation of the computer 500. The ROM 502 stores programs used for driving the CPU 501, such as initial driving load (IPL). The RAM 503 is used as a working area for the CPU 501. The HD 504 stores various data such as a program. The HDD controller 505 controls the reading and writing of various data from and to the HD 504 under control of the CPU 501.

The display 506 displays various information such as a cursor, a menu, a window, a character, or an image. The external device connection I/F 508 is an interface that connects to various external apparatuses (devices). The external device in this case is, for example, a universal serial bus (USB) memory or a printer. The network I/F 509 is an interface for exchanging data using the communication network N1. The bus line 510 is, for example, an address bus or a data bus for electrically connecting each component such as the CPU 501.

The keyboard 511 is an example of an input device provided with multiple keys for allowing a user to input characters, numerals, or various instructions. The pointing device 512 is an example of an input device that allows a user to select or execute various instructions, select an item for processing, or move a cursor being displayed. The DVD-RW drive 514 reads and writes various data from and to a DVD-RW 513 that is an example of a removable storage medium (recording medium). The removable recording medium is not limited to the DVD-RW and may be a DVD-recordable (DVD-R). The medium I/F 516 controls the reading and writing (storing) of data from and to a recording medium 515, such as a flash memory.

Functional Configuration of Image Forming System

Figure 15:
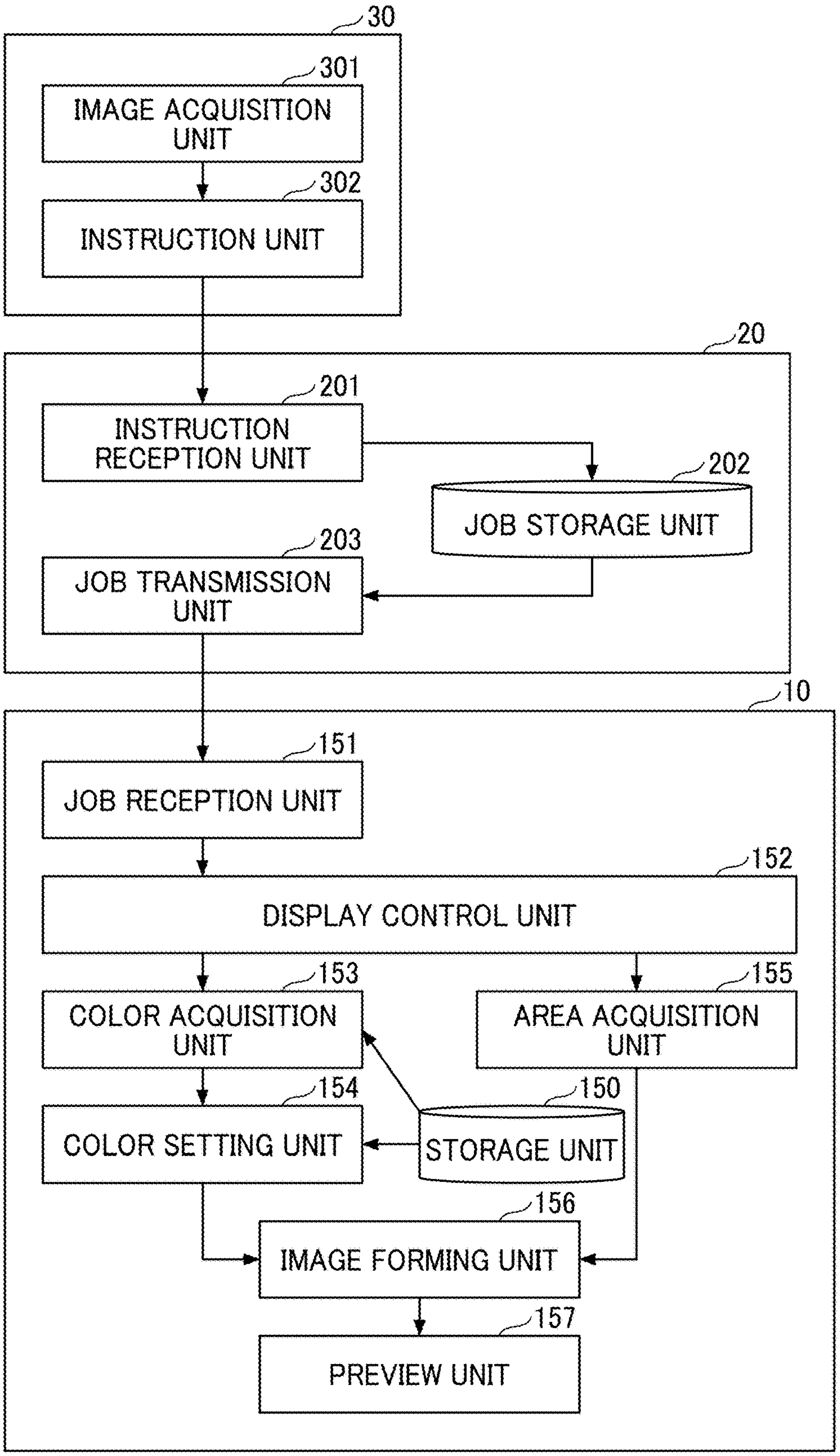
FIG. 15 is a block diagram illustrating an example of a functional configuration of an image forming system according to a first embodiment of the present disclosure.

The functional configuration of the image forming system 1000 will be described with reference to FIG. 15. FIG. 15 is a block diagram illustrating an example of a functional configuration of the image forming system according to the first embodiment.

Terminal Device

As illustrated in FIG. 15, the terminal device 30 includes an image acquisition unit 301 and an instruction unit 302.

The image acquisition unit 301 and the instruction unit 302 are implemented by, for example, processing executed by the CPU 501 and the network I/F 509 according to a program loaded from the ROM 502 to the RAM 503 illustrated in FIG. 14.

The image acquisition unit 301 acquires an image to be formed on an image forming medium. The image acquisition unit 301 may generate an image by an image editing program according to a user operation. The image acquisition unit 301 may read an image pre-stored in the HD 504 or the recording medium 515 according to a user operation. The image may include area information indicating an area in which an image forming color for applying gloss is used to form an image, or may include area information indicating an area in which an image is formed without applying gloss.

The instruction unit 302 transmits an image forming instruction to the print control apparatus 20. The image forming instruction includes image data indicating the image acquired by the image acquisition unit 301. The image forming instruction may include medium information and setting information input by the user. The medium information may include information for identifying an image forming medium, such as a type of medium, a manufacturer, and a product number, and medium characteristic information indicating characteristics or properties of image forming medium. In this case, the user may input the medium information or may set the medium information by selecting a desired medium from a media catalog. The medium information may include color information indicating a surface color of image forming medium. In this case, the user may input a numerical value of the color information or select from a color palette presenting various colors. That is, the image acquisition unit 301 can receive the settings for the medium information and the setting information via the setting screen displayed on the display 506 of the terminal device 30. The setting screen will be described in detail later. The color information may be set by measuring a surface color of image forming medium by a colorimeter connected to the terminal device 30, or medium characteristic information may be set by measuring a state of image forming medium by the colorimeter. The setting information may include gloss setting information indicating the degree of gloss.

Print Control Apparatus

As illustrated in FIG. 15, the print control apparatus 20 includes an instruction reception unit 201, a job storage unit 202, and a job transmission unit 203.

The instruction reception unit 201 and the job transmission unit 203 are implemented by, for example, processing executed by the CPU 501 and the network I/F 509 according to a program loaded from the ROM 502 to the RAM 503 illustrated in FIG. 14.

The job storage unit 202 is implemented by using, for example, the HD 504 illustrated in FIG. 14. The reading or writing of information stored in the HD 504 is performed via, for example, the HDD controller 505.

The instruction reception unit 201 receives an image forming instruction transmitted from the terminal device 30. The instruction reception unit 201 generates an image forming job based on the image forming instruction.

The job storage unit 202 stores the image forming job generated by the instruction reception unit 201.

The job transmission unit 203 stores the image forming job generated by the instruction reception unit 201 in the job storage unit 202. The job transmission unit 203 monitors the job execution status of the image forming apparatus 10, and when the job execution status indicates that a new image forming job is executable, reads one of the image forming jobs stored in the job storage unit 202 and transmits the read image forming job to the image forming apparatus 10.

Image Forming Apparatus

As illustrated in FIG. 15, the image forming apparatus 10 includes a storage unit 150, a job reception unit 151, a display control unit 152, a color acquisition unit 153, a color setting unit 154, an area acquisition unit 155, an image forming unit 156, and a preview unit 157.

The job reception unit 151, the display control unit 152, the color acquisition unit 153, the color setting unit 154, the area acquisition unit 155, and the preview unit 157 are implemented by, for example, processing executed by the CPU 121 and the communication I/F 125 according to a program loaded from the ROM 122 to the RAM 123 illustrated in FIG. 8. The storage unit 150 is implemented by using, for example, the ROM 122 or the RAM 123 illustrated in FIG. 8.

The image forming unit 156 is implemented by, for example, the writing unit 101, the image forming unit 102, the intermediate transfer belt 103, the secondary transfer unit 104, and the fixing unit 105 illustrated in FIG. 7.

The job reception unit 151 receives an image forming job. The job reception unit 151 may receive an image forming job from the print control apparatus 20. The job reception unit 151 may receive an input of an image forming job in response to an operation on an operation panel of the image forming apparatus 10.

The display control unit 152 performs control to display a screen to be operated by the user on the display 506 or the display 107. The screen to be operated by the user includes a setting screen for configuring settings for executing the pseudo-clear function and the clear function. The display 506 is an example of a display device. The display control unit 152 is an example of a reception unit that receives a user operation via the setting screen.

The color acquisition unit 153 acquires color information (in the following description, also referred to as “medium color information”) indicating a surface color (in the following description, also referred to as “medium color”) of an image forming medium. The medium color information is information indicating, for example, the values of C, M, Y, and K. The color acquisition unit 153 may receive an input of the values of C, M, Y, and K as a medium color via the setting screen, or may receive an input of a type of image forming medium or a surface color of image forming medium as information corresponding to the medium color information. The color acquisition unit 153 may measure the medium color from the image forming medium set in the image forming apparatus 10.

In the case of measuring the medium color, the color acquisition unit 153 may measure the medium color using the colorimeter 106 included in the image forming apparatus 10. The color acquisition unit 153 may receive an input for a medium color from an external colorimeter connected to the image forming apparatus 10 a type of wired or wireless interface. In this case, the image forming apparatus 10 may not include the colorimeter 106 therein.

When an image forming medium having a partially different surface color is used, the color acquisition unit 153 acquires medium color information indicating the surface color for each area with a different color. In this case, the medium color information may include information indicating the range of the area and information indicating the surface color of the area.

The color setting unit 154 sets an image forming color for applying gloss to an image based on the medium color information acquired by the color acquisition unit 153. In the following description, the image forming color set by the color setting unit 154 is also referred to as a “glossy color”. The glossy color is substantially the same color as the medium color. The color setting unit 154 generates color information indicating a glossy color (in the following description, also referred to as “glossy color information”).

The glossy color may be, for example, a color having one or more components identical to those of the medium color. The components correspond to the respective values of C, M, Y, and K when the image forming apparatus 10 performs image forming with process colors (CMYK). That is, the color setting unit 154 may set a color in which at least one of the values of C, M, Y, and K is the same as corresponding one of the values of C, M, Y, and K indicated in the medium color information as the glossy color.

The glossy color may be, for example, a color having all components identical to those of the medium color. That is, the color setting unit 154 may set a color in which the values of C, M, Y, and K are all the same as the values of C, M, Y, and K indicated in the medium color information as the glossy color.

The glossy color may be, for example, a color obtained by reducing the black component from the medium color. That is, the color setting unit 154 may set a color in which the values of C, M, and Y are the same as the values of C, M, and Y indicated in the medium color information and the value of K is less than the value of K indicated in the medium color information as the glossy color.

The glossy color may be, for example, a color obtained by removing the black component from the medium color. That is, the color setting unit 154 may set a color in which the values of C, M, and Y are the same as the values of C, M, and Y indicated in the medium color information and the value of K is 0 as the glossy color.

The color setting unit 154 can set one or more fluorescent colors based on the values of C, M, Y, and K included in the medium color information acquired by the color acquisition unit 153. For example, the color setting unit 154 can set a fluorescent color having all the same components as the medium color acquired by the color acquisition unit 153, but is not limited thereto. The gloss color may be set by a method of making one or more components the same as the medium color, a method of making all components the same as the medium color, or a method of reducing or removing the black component from the medium color. The color setting unit 154 may determine which setting method to adopt based on the value of any of C, M, Y, and K of the medium color, the medium characteristic information (medium property information), or the gloss setting information.

The color setting unit 154 can also set the fluorescent color based on the wavelength of the reflected light from the image forming medium included in the medium color information, or other information such as red, green, blue (RGB) values, hue, saturation, value (HSV) values, or hue, saturation, lightness (HSL) values. The color setting unit 154 may set the fluorescent color by, for example, the RGB values, the HSV values, or the HSL values.

The color setting unit 154 can calculate the fluorescent color by any of the setting methods each time the color acquisition unit 153 acquires the medium color information, but may set the glossy color by reading the glossy color pre-set for each medium color from the storage unit 150. In this case, the color setting unit 154 can set the glossy color by reading the glossy color corresponding to the medium color information acquired by the color acquisition unit 153 from the storage unit 150. The color setting unit 154 may set the glossy color by reading the glossy color corresponding to the medium characteristic information or the gloss setting information from the storage unit 150. The storage unit 150 may be included in any of the image forming apparatus 10, the print control apparatus 20, the terminal device 30, and an external apparatus accessible via a network.

For example, the storage unit 150 may be included in the apparatus including the color setting unit 154, or the storage unit 150 may be included in an apparatus different from the apparatus including the color setting unit 154 so that the color setting unit 154 can read the glossy color from the storage unit 150 via a network. The storage unit 150 can store the glossy color in association with the medium color information, the medium characteristic information and the gloss setting information.

The color setting unit 154 may set the glossy color having the same components as the medium color when the glossy color corresponding to the medium color information acquired by the color acquisition unit 153 is not stored in the storage unit 150. However, the present disclosure is not limited thereto, and the color setting unit 154 may set the glossy color by making one or more components the same as the medium color or by reducing or removing the black component from the medium color in a case where the glossy color corresponding to the medium color information acquired by the color acquisition unit 153 is not stored in the storage unit 150. For example, the color setting unit 154 can set the fluorescent color such that the value of one of the C, M, and Y components for which the value of the medium color is less than or equal to a first predetermined value is 0. Further, the color setting unit 154 can set the fluorescent color such that, for the component among C, M, and Y where the value of the medium color is equal to or greater than a second predetermined value, the value of that component is increased by a predetermined amount relative to the value of the medium color. At this time, the color setting unit 154 can set the fluorescent color such that, for the component among C, M, and Y where the value of the medium color is less than the second predetermined value, the value of that component is either matched to the value of the medium color or reduced by a predetermined amount relative to the value of the medium color. In any case, the fluorescent color can be set so that the K component of the medium color is less than the value of the medium color by a predetermined value or is 0.

When an image forming medium having a partially different surface color is used, the color setting unit 154 sets an image forming color for each area with a different color based on the surface color of the area. In this case, the glossy color information may include information indicating the range of the area and information indicating the glossy color of the area.

The area acquisition unit 155 acquires area information indicating an area to which gloss is to be applied to an image. The area information may include information on an area in which an image is formed with a glossy color (in the following description, also referred to as a "pseudo-clear area") and an area in which an image is formed in a transparent color (in the following description, also referred to as a "clear area"). The area acquisition unit 155 may acquire the area information according to a user operation performed on the setting screen or may acquire the area information based on information included in the image forming job.

The image forming unit 156 forms an image on an image forming medium based on the image forming job received by the job reception unit 151, the glossy color information generated by the color setting unit 154, and the area information acquired by the area acquisition unit 155. The image forming unit 156 forms an image in the pseudo-clear area indicated by the area information with a glossy color (that is, using C, M, Y, and K toners). The image forming unit 156 forms an image in the clear area indicated by the area information in a transparent color (that is, using the clear toner).

The preview unit 157 causes the display 506 to display a preview screen.

The preview screen is a screen for presenting a preview image to the user. The preview unit 157 generates the preview image based on the image forming job, the area information, and the glossy color information. Specifically, the preview unit 157 generates the preview image by converting the image in the pseudo-clear area indicated by the area information among the images included in the image forming job into the glossy color indicated by the glossy color information. The preview unit 157 is another example of the display control unit. The preview image is an example of a second image.

User Interface

The user interface of the image forming system 1000 will be described with reference to FIGS. 16 to 25.

Setting Screen

Figure 16:
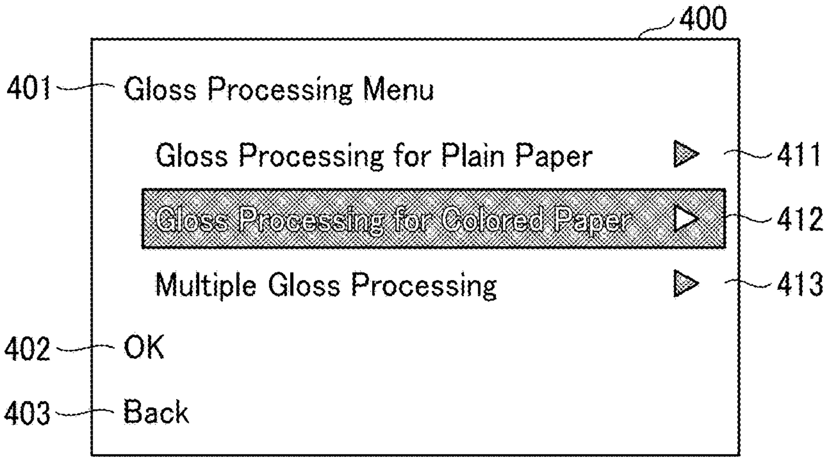
FIG. 16 is a diagram illustrating an example of a setting screen according to the first embodiment of the present disclosure.

FIG. 16 is a diagram illustrating an example of a setting screen according to the first embodiment. As illustrated in FIG. 16, a setting screen 400 includes a gloss processing menu 401, an OK button 402, and a back button 403.

The gloss processing menu 401 includes a gloss processing menu for plain paper 411, a gloss processing menu for colored paper 412, and a multiple gloss processing menu 413. The gloss processing menu for plain paper 411 is a menu for configuring settings related to the clear function. The gloss processing menu for colored paper 412 is a menu for configuring settings related to the pseudo-clear function. The multiple gloss processing menu 413 is a menu for configuring settings for applying the clear function and the pseudo-clear function.

The OK button 402 is a button for confirming the setting information set in the gloss processing menu 401. The back button 403 is a button for discarding the setting information set in the gloss processing menu 401 and returning to the previous screen.

Figure 17:
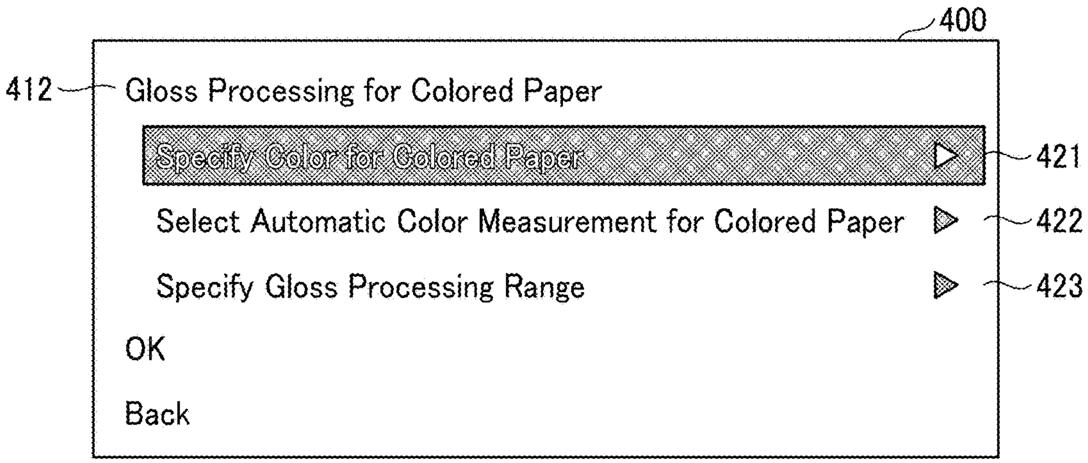
FIG. 17 is a diagram illustrating an example of a gloss processing menu for colored paper according to the first embodiment of the present disclosure.

FIG. 17 is a diagram illustrating an example of the gloss processing menu for colored paper according to the first embodiment. FIG. 17 illustrates an example of the setting screen 400 when the gloss processing menu for colored paper 412 illustrated in FIG. 16 is selected.

As illustrated in FIG. 17, the gloss processing menu for colored paper 412 includes a color specification menu 421, an automatic color measurement menu 422, and a range specification menu 423. The color specification menu 421 is a menu for acquiring a medium color according to a user operation. The automatic color measurement menu 422 is a menu for measuring the medium color by the colorimeter 106. The range specification menu 423 is a menu for specifying an area to which gloss is to be applied.

Figure 18:
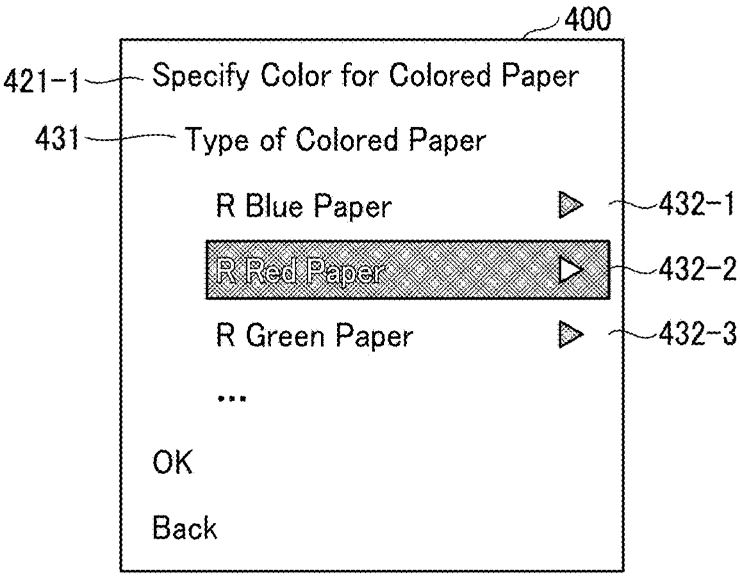
FIG. 18 is a diagram illustrating a first example of a color specification menu according to the first embodiment of the present disclosure.

FIG. 18 is a diagram illustrating a first example of the color specification menu according to the first embodiment. FIG. 18 illustrates an example of the setting screen 400 when the color specification menu 421 illustrated in FIG. 17 is selected.

As illustrated in FIG. 18, the color specification menu 421-1 may include a type selection menu 431. The type selection menu 431 may include options 432-1 to 432-3 for the type of colored paper. The options 432 may include, for example, an R blue paper 432-1, an R red paper 432-2, and an R green paper 432-3. The options 432 may be pre-set with the types of image forming medium on which an image can be formed. Each of the options 432 is associated in advance with the values of C, M, Y, and K representing the surface color of the corresponding colored paper. Further, each option 432 may be associated with the corresponding medium characteristic information.

Figure 19:
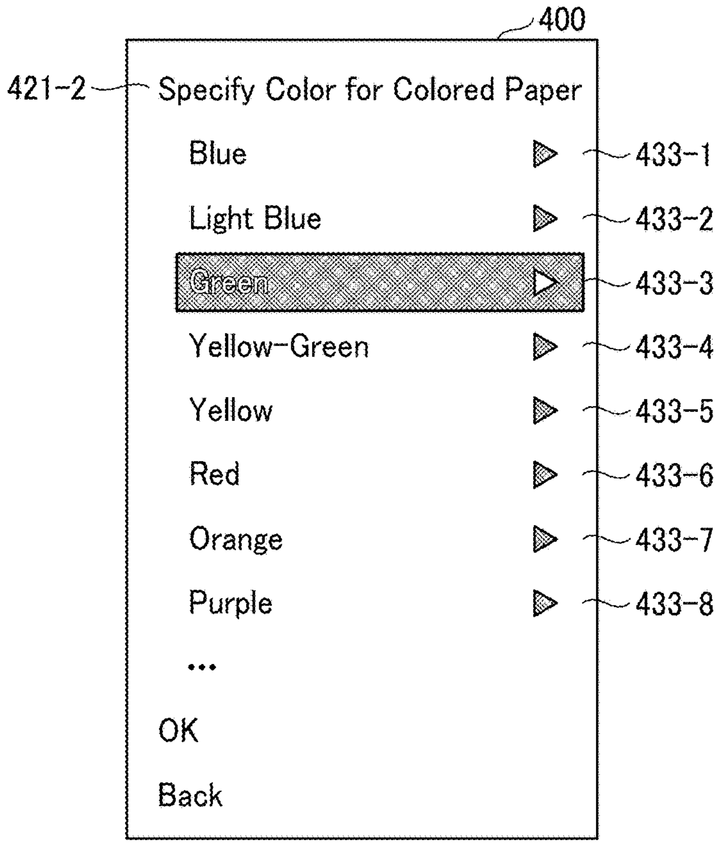
FIG. 19 is a diagram illustrating a second example of the color specification menu according to the first embodiment of the present disclosure.

FIG. 19 is a diagram illustrating a second example of the color specification menu according to the first embodiment. FIG. 19 illustrates another example of the setting screen 400 when the color specification menu 421 illustrated in FIG. 17 is selected.

As illustrated in FIG. 19, the color specification menu 421-2 may include color options 433-1 to 433-8. The options 433 may include blue 433-1, light blue 433-2, green 433-3, yellow-green 433-4, yellow 433-5, red 433-6, orange 433-7, and purple 433-8. The options 433 may be pre-set with the surface colors of image forming media on each of which an image can be formed. Each of the options 433 is associated in advance with the values of C, M, Y, and K representing the corresponding color.

Figure 20:
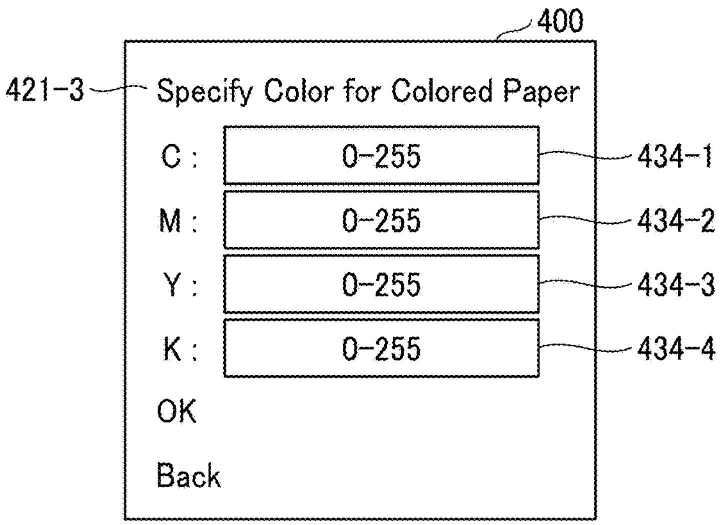
FIG. 20 is a diagram illustrating a third example of the color specification menu according to the first embodiment of the present disclosure.

FIG. 20 is a diagram illustrating a third example of the color specification menu according to the first embodiment. FIG. 20 illustrates another example of the setting screen 400 when the color specification menu 421 illustrated in FIG. 17 is selected.

As illustrated in FIG. 20, the color specification menu 421-3 may include a C value setting field 434-1, an M value setting field 434-2, a Y value setting field 434-3, and a K value setting field 434-4.

In each of the C value setting field 434-1, the M value setting field 434-2, the Y value setting field 434-3, and the K value setting field 434-4, a value between 0 and 255, inclusive, can be input. The values of C, M, Y, and K representing a surface color of image forming medium are input to the C value setting field 434-1, the M value setting field 434-2, the Y value setting field 434-3, and the K value setting field 434-4. However, the present disclosure is not limited to this, inputs of any values, such as the RGB values or the HSV values, can be used as long as the values are the setting values for a color code.

The values of C, M, Y, and K input via the setting screen can be registered in the storage unit 150 in association with the medium color, or the surface color of image forming medium. The medium characteristic information input via the setting screen can be registered in the storage unit 150 in association with a type of image forming medium. At this time, the setting screen allows for the input of the new or registered type of image forming medium, or the new or registered surface color of image forming medium, enabling these to be registered in association with the input values of C, M, Y, and K, as well as the medium characteristic information, in the storage unit. 150. The type of image forming medium registered in the storage unit 150 is displayed as a selectable option for a type of colored paper as illustrated in FIG. 18, and the registered surface color is displayed as a selectable option for a color as illustrated in FIG. 19, on the setting screen. The storage unit 150 can pre-store fluorescent colors in association with medium colors. The setting screen may allow the user to change the association between the medium color and the fluorescent color and the values of C, M, Y, and K of the fluorescent color. For example, when a type of image forming medium or a surface color of image forming medium is selected on the setting screen, the values of C, M, Y, and K of fluorescent color associated with the selected type or selected surface color may be displayed. At this time, the values of the fluorescent colors C, M, Y, and K can be changed by receiving input of the values of the fluorescent colors C, M, Y, and K and storing the values in the storage unit 150.

As described above, the color acquisition unit 153 can acquire the medium color information based on the input received via the setting screen. For example, the color acquisition unit 153 can read the values of C, M, Y, and K corresponding to the selected type of image forming medium or the selected surface color from the storage unit 150. Thus, the color setting unit 154 can set the fluorescent color based on the values of C, M, Y, and K acquired by the color acquisition unit 153.

Figure 21:
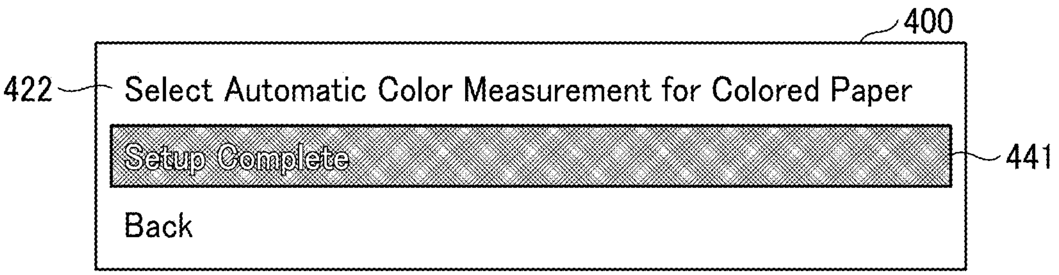
FIG. 21 is a diagram illustrating an example of an automatic color measurement menu according to the first embodiment of the present disclosure.

FIG. 21 is a diagram illustrating an example of the automatic color measurement menu according to the first embodiment.

FIG. 21 illustrates an example of the setting screen 400 when the automatic color measurement menu 422 illustrated in FIG. 17 is selected.

When the automatic color measurement menu 422 is selected in the gloss processing menu for colored paper 412, the colorimeter 106 executes color measurement processing. For example, when the image forming apparatus 10 includes the colorimeter 106, the image forming apparatus 10 may feed an image forming medium to the conveyance path R1 or R2 and measure the surface color of the conveyed image forming medium by the colorimeter 106. For example, when an external colorimeter is connected to the image forming apparatus 10 or the terminal device 30, the image forming apparatus 10 or the terminal device 30 may wait until a measurement result is input from the external colorimeter.

As illustrated in FIG. 21, when the measurement of the medium color is completed, a setting completion button 441 can be pressed. When the user presses the setting completion button 441, medium color information indicating the measured medium color is generated. The medium color information includes information indicating the measured values of C, M, Y, and K, but may include medium characteristic information obtained by measuring with the colorimeter. The measured values of C, M, Y, and K and medium characteristic information can be registered in the storage unit 150 in association with the type of image forming medium or the surface color of image forming medium. At this time, the setting screen allows for the input of the new or registered type of image forming medium, or the new or registered surface color of image forming medium, enabling these to be registered in association with the measured values of C, M, Y, and K, as well as the medium characteristic information.

Figure 22:
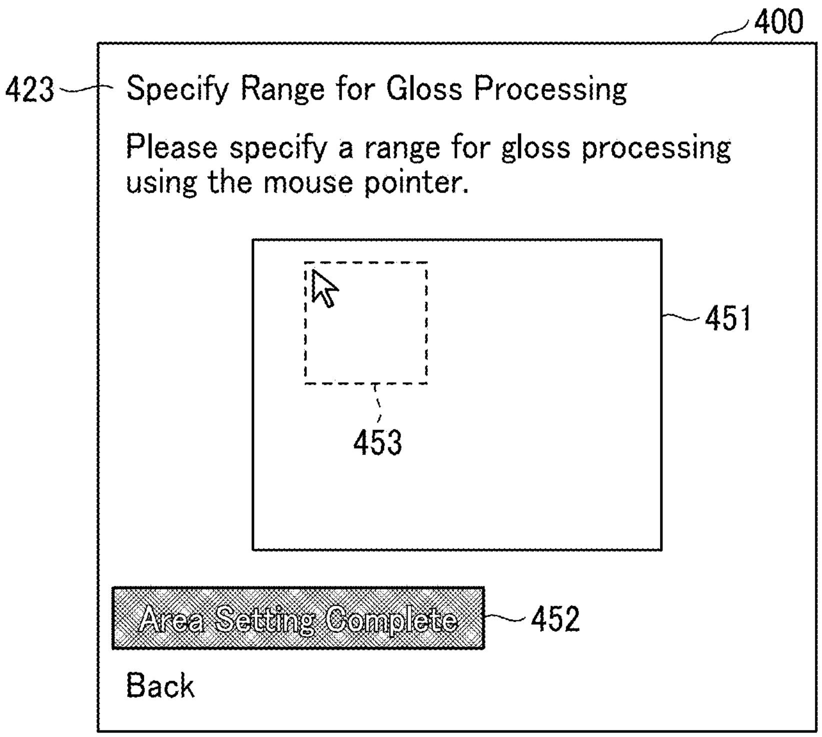
FIG. 22 is a diagram illustrating an example of a range specification menu according to the first embodiment of the present disclosure.

FIG. 22 is a diagram illustrating an example of the range specification menu according to the first embodiment. FIG. 22 illustrates an example of the setting screen 400 when the range specification menu 423 illustrated in FIG. 17 is selected.

As illustrated in FIG. 22, the range specification menu 423 includes a setting area 451 and a setting completion button 452. The range of a pseudo-clear area 453 is selected in the setting area 451.

For example, when the user selects a desired area by dragging using a pointing device, the selected area is received as the range of the pseudo-clear area 453. However, the present disclosure is not limited this, and the pseudo-clear area may be set by image data or an image forming job. For example, a specific area in the image can be set as the pseudo-clear area. The image may include area information indicating an area in which an image forming color for applying gloss is formed, and area information indicating an area in which an image to which gloss is not to be applied is formed. In this case, the pseudo-clear area is set based on the area information indicating an area in which an image forming color for applying gloss is formed among multiple areas in the image.

When the user presses the setting completion button 452 after the range of the pseudo-clear area 453 is selected, area information indicating the input pseudo-clear area is generated.

Figure 23:
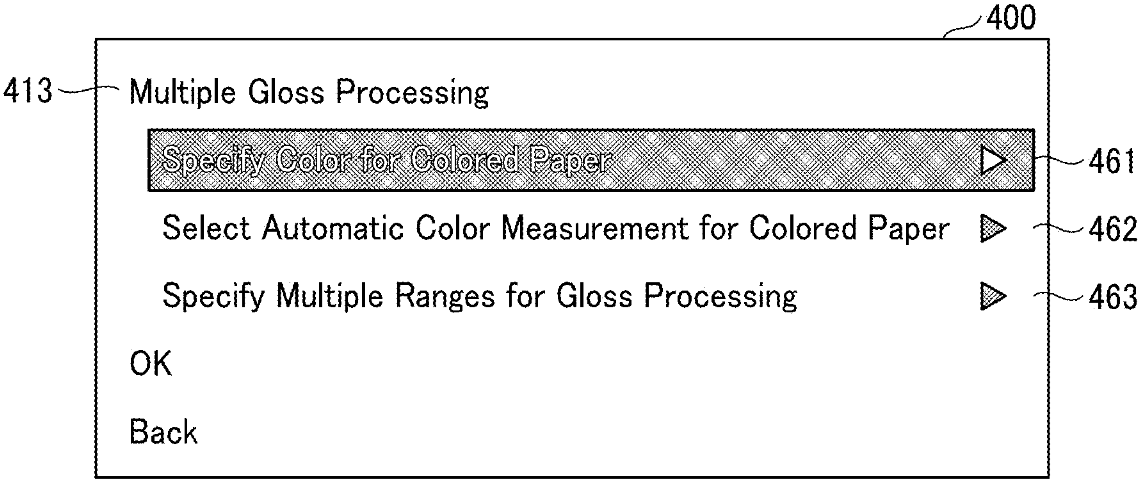
FIG. 23 is a diagram illustrating an example of a multiple gloss processing menu according to the first embodiment of the present disclosure.

FIG. 23 is a diagram illustrating an example of the multiple gloss processing menu according to the first embodiment. FIG. 23 illustrates an example of the setting screen 400 when the multiple gloss processing menu 413 illustrated in FIG. 16 is selected.

As illustrated in FIG. 23, the multiple gloss processing menu 413 includes a color specification menu 461, an automatic color measurement menu 462, and a multiple-range specification menu 463. The color specification menu 461 and the automatic color 515 measurement menu 462 are the same as the color specification menu 421 and the automatic color measurement menu 422 of the gloss processing menu for colored paper 412 (see FIG. 17). The multiple-range specification menu 463 is a menu for specifying a pseudo-clear area and a clear area.

Figure 24:
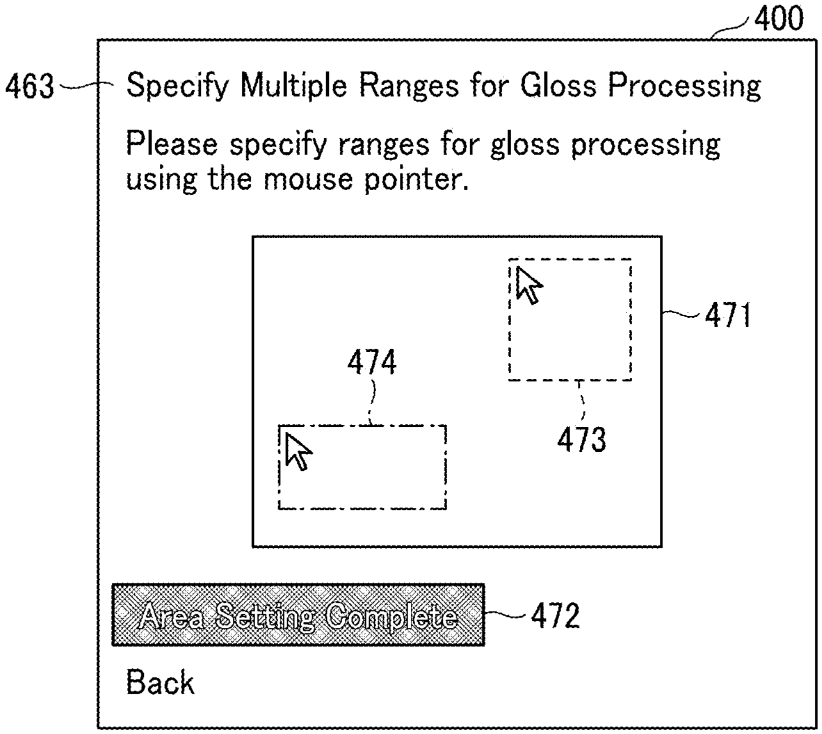
FIG. 24 is a diagram illustrating an example of a multiple-range specification menu according to the first embodiment of the present disclosure.

FIG. 24 is a diagram illustrating an example of the multiple-range specification menu according to the first embodiment. FIG. 24 illustrates an example of the setting screen 400 when the multiple-range specification menu 463 illustrated in FIG. 23 is selected.

As illustrated in FIG. 24, the multiple-range specification menu 463 includes a setting area 471 and a setting completion button 472. The range of a pseudo-clear area 473 and a clear area 474 are input to the setting area 471. One of the pseudo-clear area 473 and the clear area 474 may be input alone. Multiple pseudo-clear areas 473 and multiple clear areas 474 may be input. The pseudo-clear area 473 is an example of a first area. The clear area 474 is an example of a second area.

For example, when the user selects a desired area by dragging using a pointing device, the selected area is received as the range of the pseudo-clear area 473 or the clear area 474. Whether the area is specified as the pseudo-clear area 473 or the clear area 474 may be selected by the user in advance or may be selected later.

When the user presses the setting completion button 472 after at least one of the pseudo-clear area 473 and the clear area 474 is selected, area information indicating the selected pseudo-clear area and/or clear area is generated.

Preview Screen

Figure 25:
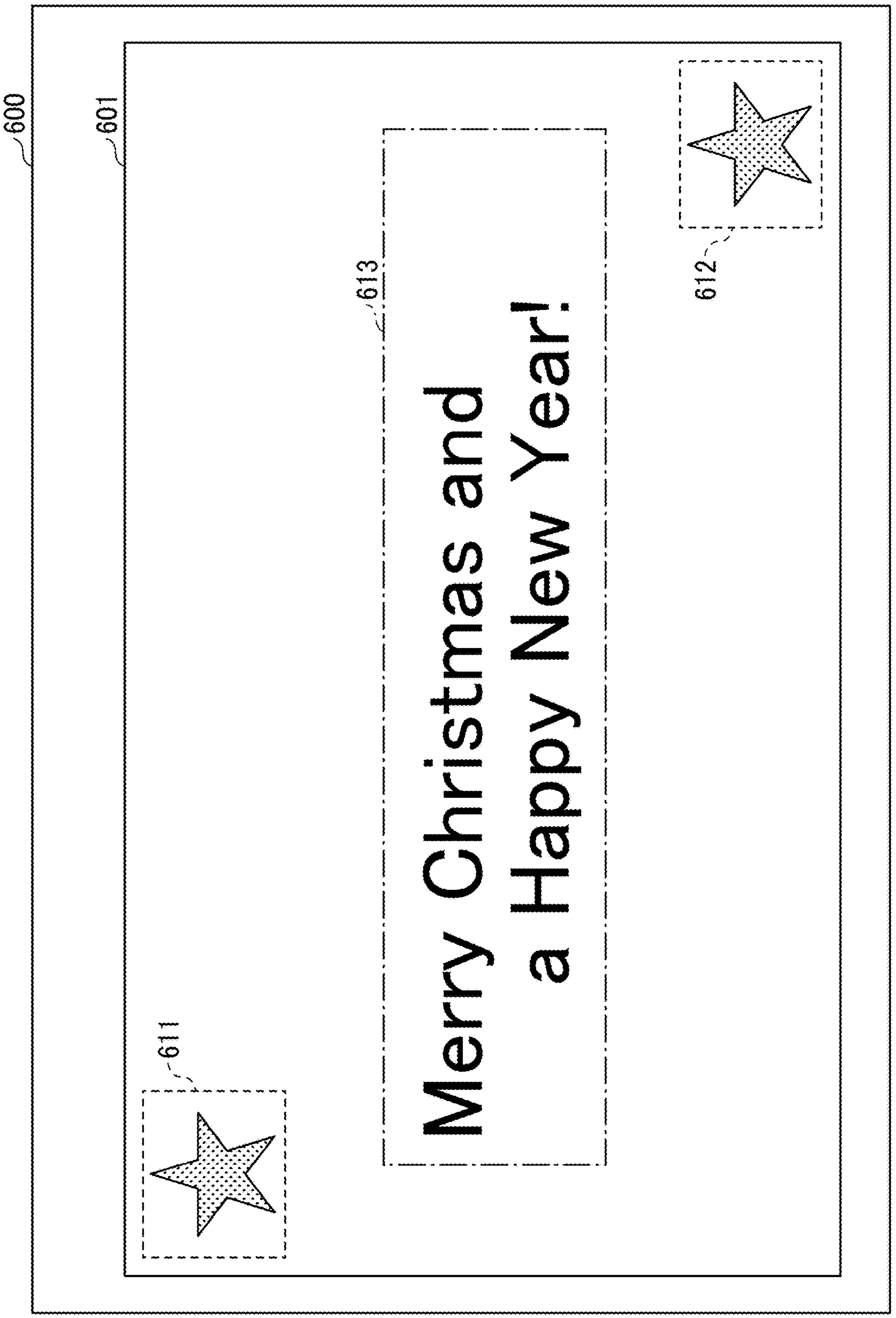
FIG. 25 is a diagram illustrating an example of a preview screen according to the first embodiment of the present disclosure.

FIG. 25 is a diagram illustrating an example of a preview screen according to the first embodiment. As illustrated in FIG. 25, a preview screen 600 includes a preview image area 601. The preview image area 601 displays a preview image. The preview image may include pseudo-clear areas 611 and 612. The preview image may include a clear area 613.

Regarding the pseudo-clear areas 611 and 612, a portion included in the area of the image formed on the image forming medium is converted so as to have a glossy appearance to be displayed. Specifically, the pseudo-clear areas 611 and 612 are converted in a manner that the image included in the area is converted into a glossy color TO BE displayed.

The clear area 613 is displayed in a manner that a portion included in the area of the image formed on the image forming medium is converted to be with cloudiness. Specifically, the clear area 613 is displayed by converting the color of the image included in the area to be closer to white.

Process Performed by Image Forming System

Figure 26:
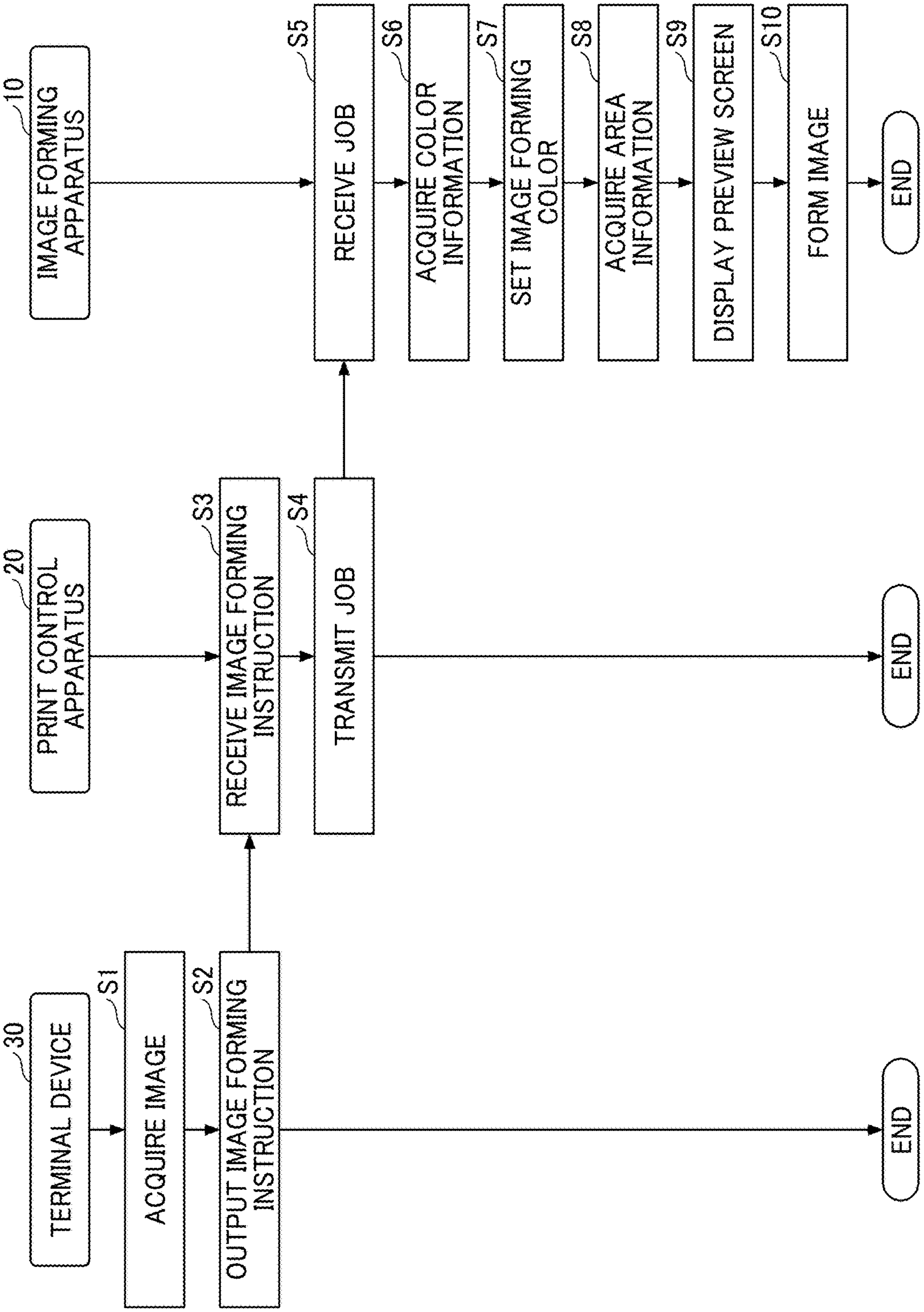
FIG. 26 is a sequence diagram illustrating an example of an image forming method according to the first embodiment of the present disclosure.

An image forming method performed by the image forming system 1000 will be described with reference to FIG. 26. FIG. 26 is a sequence diagram illustrating an example of the image forming method according to the first embodiment.

In Step S1, the image acquisition unit 301 of the terminal device 30 acquires an image to be formed on an image forming medium according to a user operation. The image acquisition unit 301 transmits the acquired image to the instruction unit 302.

In Step S2, the instruction unit 302 of the terminal device 30 receives the image from the image acquisition unit 301. Subsequently, the instruction unit 302 generates an image forming instruction. The image forming instruction includes image data representing an image. The image forming instruction may include medium information and setting information input by the user. The instruction unit 302 transmits the image forming instruction to the print control apparatus 20.

In Step S3, the instruction reception unit 201 of the print control apparatus 20 receives the image forming instruction from the terminal device 30. Subsequently, the instruction reception unit 201 generates an image forming job based on the received image forming instruction. Then, the instruction reception unit 201 stores the generated image forming job in the job storage unit 202.

In Step S4, the job transmission unit 203 of the print control apparatus 20 monitors the job execution status of the image forming apparatus 10, and when the job execution status indicates that a new image forming job is executable, reads one of the image forming jobs from the job storage unit 202. When multiple image forming jobs are stored in the job storage unit 202, the job transmission unit 203 may read an image forming job that was stored earliest. Then, the job transmission unit 203 transmits the read image forming job to the image forming apparatus 10.

In Step S5, the job reception unit 151 of the image forming apparatus 10 receives the image forming job from the print control apparatus 20. Subsequently, the job reception unit 151 receives the received image forming job. Then, the job reception unit 151 transmits the received image forming job to the display control unit 152 and the image forming unit 156.

The display control unit 152 receives the image forming job from the job reception unit 151. The display control unit 152 causes the display 506 to display the setting screen 400 related to the received image forming job. The display control unit 152 may display the setting screen 400 according to a user operation. The user operation may include an operation of selecting the image forming job to be set.

In Step S6, the color acquisition unit 153 of the image forming apparatus 10 acquires medium color information indicating a surface color of an image forming medium according to a user operation performed on the setting screen 400. The color acquisition unit 153 may acquire the medium color information in accordance with an operation on the color specification menu 421 or the automatic color measurement menu 422 of the gloss processing menu for colored paper 412, or the color specification menu 461 or the automatic color measurement menu 462 of the multiple gloss processing menu 413. Then, the color acquisition unit 153 transmits the acquired medium color information to the color setting unit 154.

In Step S7, the color setting unit 154 of the image forming apparatus 10 receives the medium color information from the color acquisition unit 153. Subsequently, the color setting unit 154 sets a glossy color based on the medium color information. Subsequently, the color setting unit 154 generates glossy color information indicating the set glossy color. Then, the color setting unit 154 transmits the generated glossy color information to the image forming unit 156.

In Step S8, the area acquisition unit 155 of the image forming apparatus 10 acquires area information according to a user operation on the setting screen 400. The area information may include a pseudo-clear area or a clear area. The area acquisition unit 155 may acquire the area information in accordance with an operation on the range specification menu 423 or the multiple-range specification menu 463. Then, the area acquisition unit 155 transmits the acquired area information to the image forming unit 156.

In Step S9, the image forming unit 156 of the image forming apparatus 10 receives the image forming job from the job reception unit 151. The image forming unit 156 also receives the glossy color information from the color setting unit 154. Furthermore, the image forming unit 156 receives the area information from the area acquisition unit 155. Subsequently, the image forming unit 156 transmits the image forming job, the glossy color information, and the area information to the preview unit 157.

The preview unit 157 receives the image forming job, the glossy color information, and the area information from the image forming unit 156. Subsequently, the preview unit 157 generates a preview image based on the image forming job, the glossy color information, and the area information. Specifically, the preview unit 157 converts an image in the pseudo-clear area indicated by the area information among the images included in the image forming job into the glossy color indicated by the glossy color information. Thus, the preview image is generated.

Subsequently, the preview unit 157 generates screen data for displaying the preview screen 600 including the preview image. Then, the preview unit 157 causes the display 506 to display the preview screen 600 based on the screen data.

In Step S10, the image forming unit 156 of the image forming apparatus 10 forms the image on the image forming medium based on the image forming job, the glossy color information, and the area information. The image forming unit 156 forms an image in the pseudo-clear area in a glossy color (that is, using the C, M, Y, and K toners) among the images formed on the image forming medium. The image forming unit 156 forms an image in the clear area in a transparent color (that is, using the clear toner).

The image forming unit 156 may form the image on the image forming medium without displaying the preview screen 600. In this case, in Step S9, the image forming unit 156 may not transmit the image forming job, the glossy color information, and the area information to the preview unit 157.

The image forming apparatus 10 according to the present embodiment sets a glossy color for applying gloss to an image based on the surface color of an image forming medium on which the image is to be formed, and forms the image on the image forming medium with the glossy color. In one aspect, an image having high glossiness can be formed.

The image forming medium may be a colored image forming medium. The image forming medium may be colored paper. According to the present embodiment, an image having high glossiness can be formed on a colored image forming medium.

The glossy color may have one or more components identical to the one or more components of the surface color of the image forming medium. The glossy color may be the same color as the surface color of the image forming medium. The image forming color may be a color obtained by reducing a black component from the surface color of the image forming medium. The glossy color may be a color obtained by removing a black component from the surface color of the image forming medium. According to the present embodiment, an image with enhanced glossiness can be formed.

The image forming apparatus 10 may form an image with a glossy color in an area where gloss is to be applied to the image. The image forming apparatus 10 may form an image with a glossy color in the pseudo-clear area and form an image with a transparent color in the clear area. According to the present embodiment, a printed material with rich expressiveness including an area to which gloss is applied and an area with cloudiness can be produced.

The image forming apparatus 10 may acquire the surface color of the image forming medium measured by using a colorimeter. According to the present embodiment, the surface color of an image forming medium can be acquired simply and accurately.

The image forming apparatus 10 may display the preview image obtained by converting the image into the glossy color on the display. According to the present embodiment, the user can easily recognize the image formed on the image forming medium.

Second Embodiment

In the first embodiment, the configuration in which the image forming apparatus 10 sets the pseudo-clear function and forms an image with a glossy color according to the settings for the pseudo-clear function has been described. In the second embodiment, a configuration in which the print control apparatus 20 sets the pseudo-clear function and the image forming apparatus 10 forms an image with a glossy color in accordance with an instruction from the print control apparatus 20 will be described.

The image forming system 1000 according to the second embodiment will be described below, focusing on the differences from the first embodiment.

Functional Configuration of Image Forming System

Figure 27:
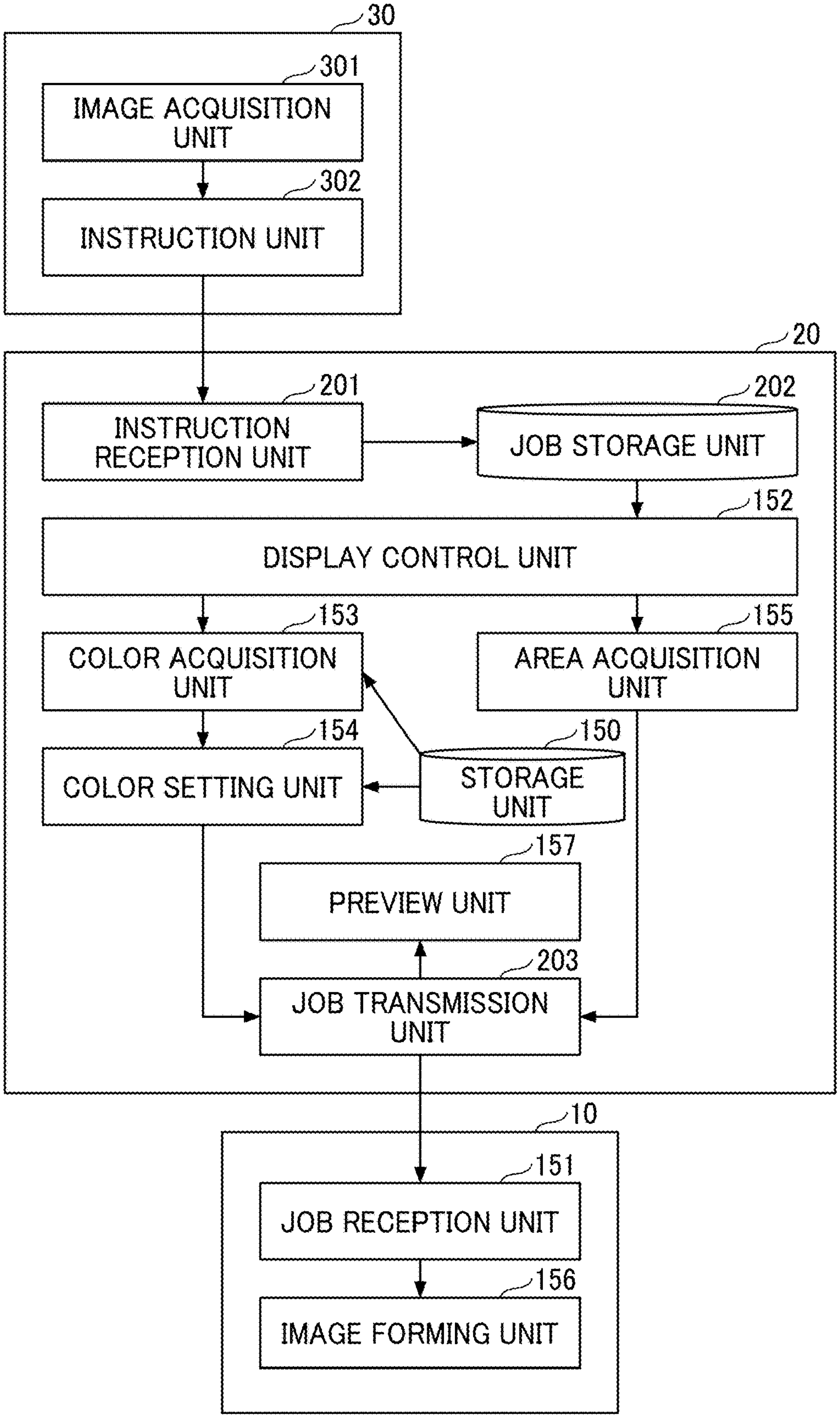
FIG. 27 is a block diagram illustrating an example of a functional configuration of an image forming system according to a second embodiment of the present disclosure.

A functional configuration of an image forming system 1000 according to the second embodiment will be described with reference to FIG. 27. FIG. 27 is a block diagram illustrating an example of a functional configuration of an image forming system according to the second embodiment.

Print Control Apparatus

As illustrated in FIG. 27, the print control apparatus 20 includes the storage unit 150, the display control unit 152, the color acquisition unit 153, the color setting unit 154, the area acquisition unit 155, the preview unit 157, the instruction reception unit 201, the job storage unit 202, and the job transmission unit 203. That is, the print control apparatus 20 according to the second embodiment is different from that of the first embodiment in that the print control apparatus 20 further includes the storage unit 150, the display control unit 152, the color acquisition unit 153, the color setting unit 154, the area acquisition unit 155, and the preview unit 157.

In the present embodiment, the job transmission unit 203 is an example of an output unit. The image forming job is an example of information for instructing to form an image.

In the present embodiment, the print control apparatus 20 may be connected to an external colorimeter via a type of wired or wireless interface. The color acquisition unit 153 may receive an input for a medium color from a colorimeter connected to the print control apparatus 20.

Image Forming Apparatus

As illustrated in FIG. 27, the image forming apparatus 10 includes the job reception unit 151 and the image forming unit 156. That is, the image forming apparatus 10 according to the second embodiment is different from that of the first embodiment in that the image forming apparatus 10 according to the second embodiment does not include the storage unit 150, the display control unit 152, the color acquisition unit 153, the color setting unit 154, the area acquisition unit 155, and the preview unit 157.

Process Performed by Image Forming System

Figure 28:
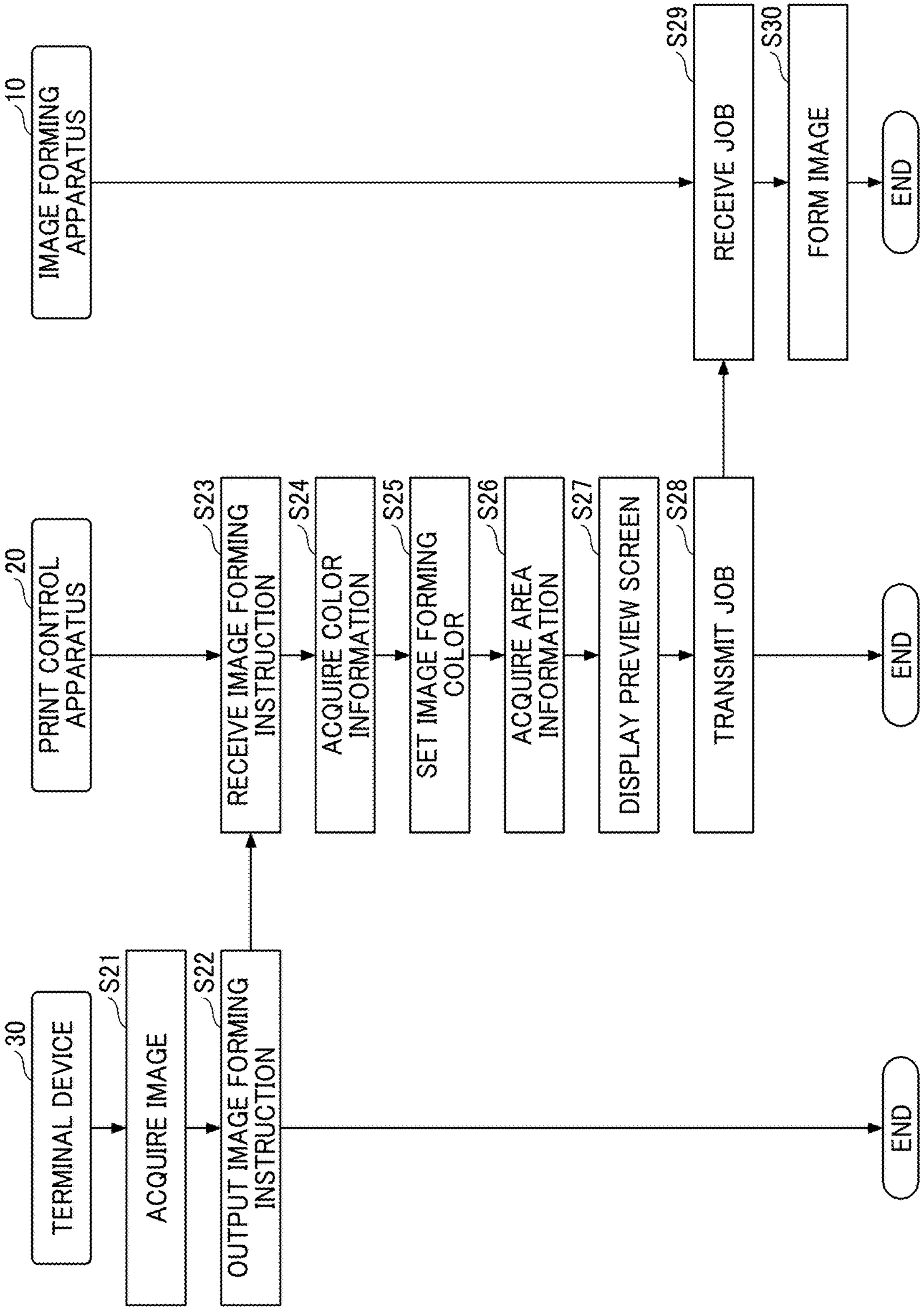
FIG. 28 is a sequence diagram illustrating an example of an image forming method according to the second embodiment of the present disclosure.

An image forming method according to the second embodiment will be described with reference to FIG. 28. FIG. 28 is a sequence diagram illustrating an example of an image forming method according to the second embodiment.

In Step S21, the image acquisition unit 301 of the terminal device 30 acquires an image to be formed on an image forming medium according to a user operation. The image acquisition unit 301 transmits the acquired image to the instruction unit 302.

In Step S22, the instruction unit 302 of the terminal device 30 receives the image from the image acquisition unit 301. Subsequently, the instruction unit 302 generates an image forming instruction. Then, the instruction unit 302 transmits the image forming instruction to the print control apparatus 20.

In Step S23, the instruction reception unit 201 of the print control apparatus 20 receives the image forming instruction from the terminal device 30. Subsequently, the instruction reception unit 201 generates an image forming job based on the received image forming instruction. Then, the instruction reception unit 201 stores the generated image forming job in the job storage unit 202 and transmits the image forming job to the display control unit 152.

The display control unit 152 receives the image forming job from the instruction reception unit 201. The display control unit 152 causes the display 506 to display the setting screen 400 related to the received image forming job.

In Step S24, the color acquisition unit 153 of the print control apparatus 20 acquires medium color information indicating the surface color of an image forming medium according to a user operation on the setting screen 400. Then, the color acquisition unit 153 transmits the acquired medium color information to the color setting unit 154.

In Step S25, the color setting unit 154 of the print control apparatus 20 receives the medium color information from the color acquisition unit 153. Subsequently, the color setting unit 154 sets a glossy color based on the medium color information. Subsequently, the color setting unit 154 generates glossy color information indicating the set glossy color. Then, the color setting unit 154 transmits the generated glossy color information to the job transmission unit 203.

In Step S26, the area acquisition unit 155 of the print control apparatus 20 acquires area information according to a user operation on the setting screen 400. Then, the area acquisition unit 155 transmits the acquired area information to the job transmission unit 203.

In Step S27, the job transmission unit 203 of the print control apparatus 20 receives the glossy color information from the color setting unit 154. The job transmission unit 203 also receives the area information from the area acquisition unit 155. Subsequently, the job transmission unit 203 transmits the glossy color information and the area information to the preview unit 157.

The preview unit 157 receives the glossy color information and the area information from the job transmission unit 203.

Subsequently, the preview unit 157 reads the image forming job from the job storage unit 202. Subsequently, the preview unit 157 generates a preview image based on the image forming job, the glossy color information, and the area information.

Specifically, the preview unit 157 converts an image in the pseudo-clear area indicated by the area information among the images included in the image forming job into the glossy color indicated by the glossy color information. Subsequently, the preview unit 157 generates screen data for displaying the preview screen 600 including the preview image. Then, the preview unit 157 causes the display 506 to display the preview screen 600 based on the screen data.

In Step S28, the job transmission unit 203 of the print control apparatus 20 monitors the job execution status of the image forming apparatus 10, and when the job execution status indicates that a new image forming job is executable, reads one of the image forming jobs from the job storage unit 202.

Subsequently, the job transmission unit 203 performs conversion in relation to the read image forming job based on the glossy color information and the area information. The job transmission unit 203 performs conversion in relation to the image forming job so as to instruct to form an image in the pseudo-clear area with a glossy color and to form an image in the clear area with a transparent color, among the images included in the image forming job. Then, the job transmission unit 203 transmits the converted image forming job to the image forming apparatus 10.

In Step S29, the job reception unit 151 of the image forming apparatus 10 receives the image forming job from the print control apparatus 20. Subsequently, the job reception unit 151 receives the received image forming job. Then, the job reception unit 151 transmits the received image forming job to the image forming unit 156.

In Step S30, the image forming unit 156 of the image forming apparatus 10 forms an image on an image forming medium based on the image forming job. The image forming unit 156 forms an image in the pseudo-clear area with a glossy color, among images formed on the image forming medium. The image forming unit 156 forms an image in the clear area with a transparent color.

The print control apparatus 20 according to the present embodiment sets a glossy color for applying gloss to an image based on the surface color of an image forming medium on which the image is to be formed, and outputs an image forming job instructing to form an image on the image forming medium with the glossy color. The image forming apparatus 10 forms the image on the image forming medium with the glossy color in accordance with the image forming job output from the print control apparatus 20. In one aspect, an image having high glossiness can be formed.

Variation 1

In the second embodiment, the configuration in which the print control apparatus 20 sets the pseudo-clear function and the image forming apparatus 10 forms an image with a glossy color in accordance with an instruction from the print control apparatus 20 has been described. In a first variation, a configuration in which a glossy image is previewed with the terminal device 30 will be described.

The image forming system 1000 according to the first variation will be described below, focusing on the differences from the second embodiment.

Functional Configuration of Terminal Device

A functional configuration of the terminal device 30 according to the first variation will be described with reference to FIG. 29.

Figure 29:
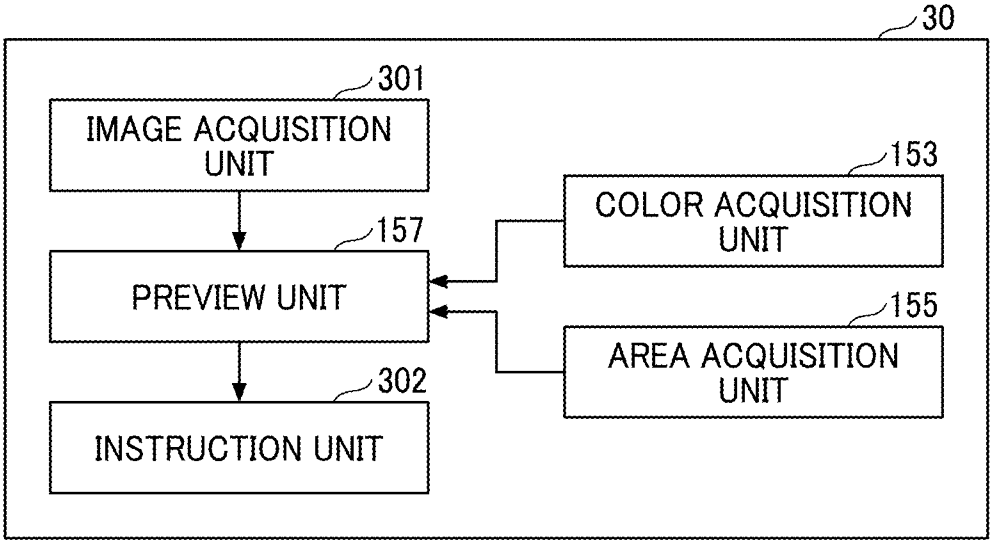
FIG. 29 is a block diagram illustrating an example of a functional configuration of a terminal device according to a first variation.

FIG. 29 is a block diagram illustrating an example of a functional configuration of a terminal device according to the first variation.

As illustrated in FIG. 29, the terminal device 30 according to the first variation includes the color acquisition unit 153, the area acquisition unit 155, the preview unit 157, the image acquisition unit 301, and the instruction unit 302. That is, the terminal device 30 according to the first variation is different from the terminal device 30 according to the first embodiment in that the terminal device 30 according to the first variation further includes the color acquisition unit 153, the area acquisition unit 155, and the preview unit 157.

In the present variation, the terminal device 30 may have image editing software installed in advance. The image editing software may have a function of creating an image, specifying an area, or previewing an image using a special color registered in advance. The terminal device 30 can implement image creation, area specification, or preview using a medium color by registering the medium color as a special color with the image editing software.

In the present variation, the color acquisition unit 153 acquires medium color information according to a user operation. The color acquisition unit 153 may receive an input for a medium color via a screen operated by the user. The input of the medium color may be performed by an operation on a color selection screen for selecting a color from various colors. The color selection screen may be, for example, a color palette.

The input of the medium color may be performed by an operation on the medium selection screen for selecting a type of image forming medium. The medium selection screen may display a predetermined media catalog. In the media catalog, an image forming medium on which an image may be formed may be registered in advance.

The type of image forming medium may be associated with the values of C, M, Y, and K representing a surface color of image forming medium. The values of C, M, Y, and K may be pre-set so as to reproduce the surface structure of the image forming medium. The color acquisition unit 153 may acquire the values of C, M, Y, and K associated with the selected type of image forming medium as the medium color information.

In the present variation, the area acquisition unit 155 acquires area information indicating an area to which gloss is to be applied to an image. The area information may include a pseudo-clear area and a clear area. The area acquisition unit 155 may acquire the area information via a screen operated by the user.

In the present variation, the preview unit 157 causes the display 506 to display a preview screen. The preview unit 157 generates a preview image by converting an image in the pseudo-clear area indicated by the area information, of the image acquired by the image acquisition unit 301, into a medium color or an approximate color of the medium color.

In this variation, the image acquisition unit 301 may generate an image using image editing software. The image acquisition unit 301 may draw the image in the pseudo-clear area with the medium color according to a user operation.

In the present variation, the instruction unit 302 transmits the image forming instruction to the print control apparatus 20. The image data included in the image forming instruction includes information instructing to apply gloss to an image included in the pseudo-clear area.

The instruction reception unit 201 of the print control apparatus 20 recognizes that the gloss is to be applied to the image included in the pseudo-clear area based on the image forming instruction received from the terminal device 30. The instruction reception unit 201 generates an image forming job instructing to form an image included in the pseudo-clear area with a glossy color based on the image forming instruction.

User Interface

A user interface of the image forming system 1000 according to the first variation will be described with reference to FIG. 30.

Preview Screen

Figure 30:
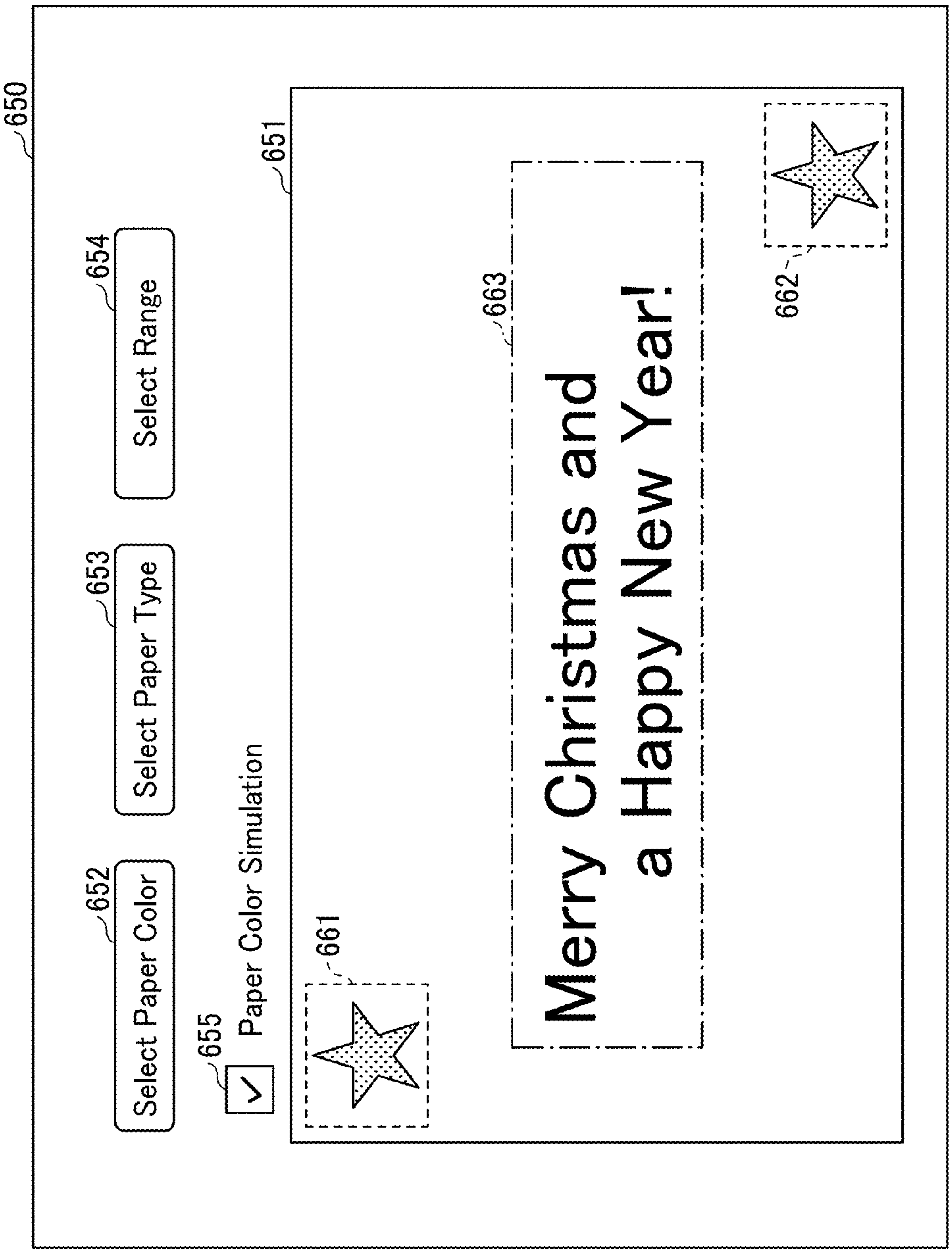
FIG. 30 is a diagram illustrating an example of a preview screen according to the first variation.

FIG. 30 is a diagram illustrating an example of a preview screen according to the first variation. As illustrated in FIG. 30, a preview screen 650 includes a preview image area 651, a paper color selection button 652, a paper type selection button 653, a range specification button 654, and a simulate button 655. The preview image area 651 displays a preview image. The preview image may include pseudo-clear areas 661 and 662. The preview image may include a clear area 663.

The paper color selection button 652 is a button for activating a color selection screen. When the user presses the paper color selection button 652, a color selection screen is activated. The color selection screen may include a color palette presenting various colors. When the user selects the surface color of image forming medium on the color selection screen, the color acquisition unit 153 acquires medium color information indicating the selected color.

The paper type selection button 653 is a button for activating a medium selection screen. When the user presses the paper type selection button 653, a medium selection screen is activated. The medium selection screen may include a media catalog in which various image forming media are registered in advance. When the user selects a type of image forming medium on the medium selection screen, the color acquisition unit 153 acquires medium color information indicating the surface color of image forming medium associated with the selected type of image forming medium.

The range specification button 654 is a button for specifying a range for the pseudo-clear area or the clear area. The range of the area may be specified in the preview image area 651, for example. When the user selects a desired area in the preview image area 651 by dragging using a pointing device, the selected area is received as the range of the pseudo-clear area or the clear area.

The simulate button 655 is a button for reflecting the surface color of image forming medium on the preview image. When the user presses the simulate button 655, the preview image displayed in the preview image area 651 is converted into an image to be formed on the image forming medium with the medium color. For example, the background color of the preview image changes to the medium color. Further, for example, the image in the pseudo-clear area is converted into the medium color or the approximate color of the medium color.

The terminal device 30 according to the first variation displays, on the display, a preview image obtained by converting an image included in an area to be applied with gloss into the surface color of image forming medium or an approximate color of the surface color. According to the present variation, the user can easily recognize the image formed on the image forming medium.

The terminal device 30 may acquire the surface color of the image forming medium associated with the type of image forming medium selected by the user. According to the present variation, the user can intuitively select a surface color of image forming medium.

The terminal device 30 may output an image forming instruction including information for instructing to apply gloss to an image included in the area to be applied with gloss. According to this variation, an image having high glossiness can be formed.

Third Embodiment

In the second embodiment, the configuration in which the print control apparatus 20 sets the pseudo-clear function and the image forming apparatus 10 forms an image with a glossy color in accordance with an instruction from the print control apparatus 20 has been described. In the third embodiment, a configuration in which the terminal device 30 sets the pseudo-clear function and the image forming apparatus 10 forms an image with a glossy color in accordance with an instruction from the terminal device 30 will be described.

The image forming system 1000 according to the third embodiment will be described below, focusing on the differences from the first embodiment.

Functional Configuration of Image Forming System

Figure 31:
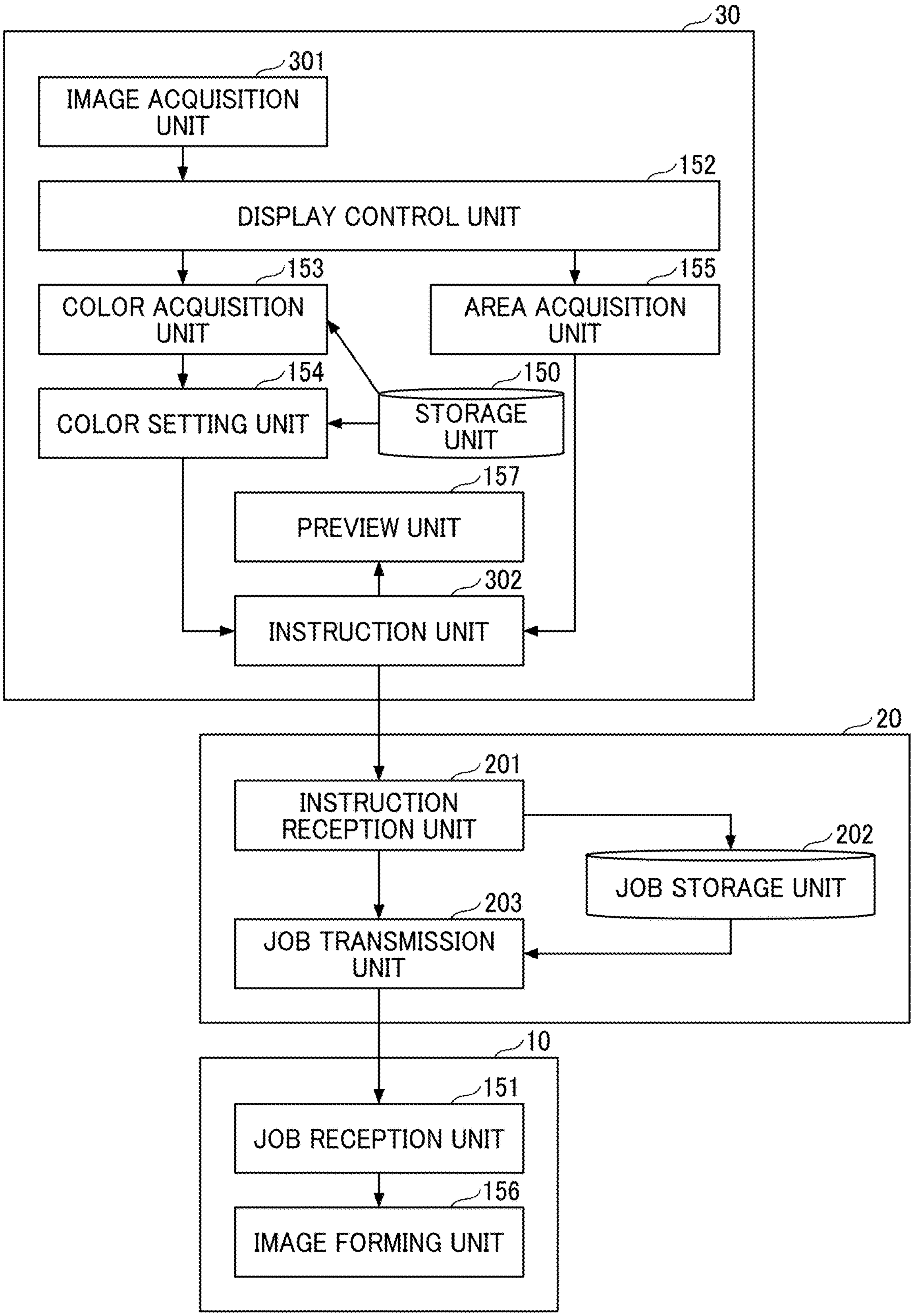
FIG. 31 is a block diagram illustrating an example of a functional configuration of an image forming system according to a third embodiment of the present disclosure.

A functional configuration of an image forming system 1000 according to the third embodiment will be described with reference to FIG. 31. FIG. 31 is a block diagram illustrating an example of a functional configuration of an image forming system according to the third embodiment.

Terminal Device

As illustrated in FIG. 31, the terminal device 30 includes the storage unit 150, the display control unit 152, the color acquisition unit 153, the color setting unit 154, the area acquisition unit 155, the preview unit 157, the image acquisition unit 301, and the instruction unit 302. That is, the terminal device 30 according to the third embodiment is different from that in the first embodiment in that the terminal device 30 further includes the storage unit 150, the display control unit 152, the color acquisition unit 153, the color setting unit 154, the area acquisition unit 155, and the preview unit 157.

In the present embodiment, the instruction unit 302 is an example of an output unit. The image forming instruction is an example of information for instructing to form an image.

In the present embodiment, the terminal device 30 may be connected to an external colorimeter via a type of wired or wireless interface. The color acquisition unit 153 may receive an input for a medium color from a colorimeter connected to the terminal device 30.

Image Forming Apparatus

As illustrated in FIG. 31, the image forming apparatus 10 includes the job reception unit 151 and the image forming unit 156. That is, the image forming apparatus 10 in the third embodiment is different from that in the first embodiment in that the image forming apparatus 10 according to the third embodiment does not include the storage unit 150, the display control unit 152, the color acquisition unit 153, the color setting unit 154, the area acquisition unit 155, and the preview unit 157.

Process Performed by Image Forming System

Figure 32:
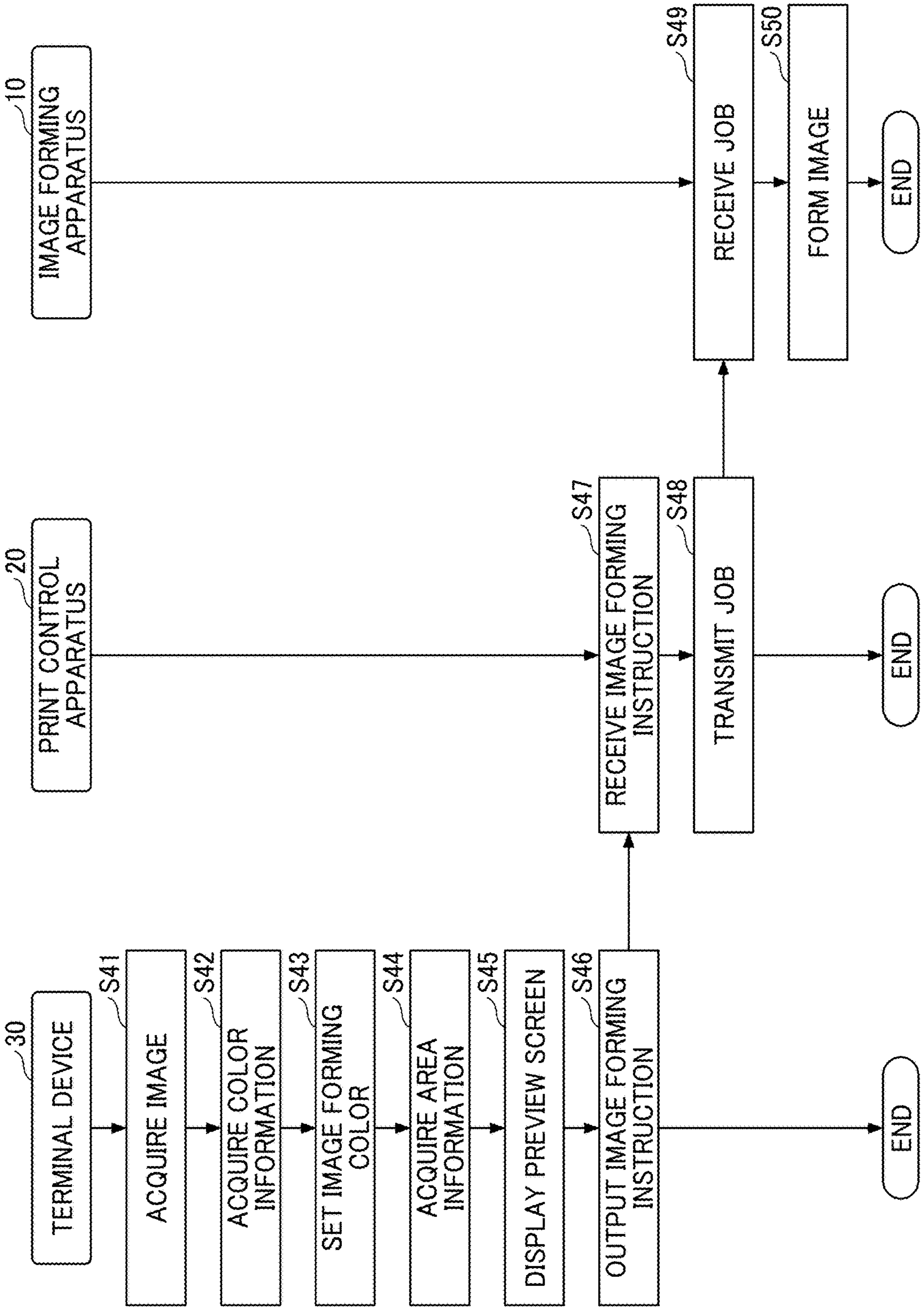
FIG. 32 is a sequence diagram illustrating an example of an image forming method according to a third embodiment of the present disclosure.

An image forming method according to the third embodiment will be described with reference to FIG. 32. FIG. 32 is a sequence diagram illustrating an example of an image forming method according to the third embodiment.

In Step S41, the image acquisition unit 301 of the terminal device 30 acquires an image to be formed on an image forming medium according to a user operation. The image acquisition unit 301 transmits the acquired image to the display control unit 152 and the instruction unit 302.

The display control unit 152 receives the image from the image acquisition unit 301. The display control unit 152 causes the display 506 to display the setting screen 400 related to the received image.

In Step S42, the color acquisition unit 153 of the terminal device 30 acquires medium color information indicating the surface color of image forming medium according to a user operation on the setting screen 400. Then, the color acquisition unit 153 transmits the acquired medium color information to the color setting unit 154.

In Step S43, the color setting unit 154 of the terminal device 30 receives the medium color information from the color acquisition unit 153. Subsequently, the color setting unit 154 sets a glossy color based on the medium color information. Subsequently, the color setting unit 154 generates glossy color information indicating the set glossy color. Then, the color setting unit 154 transmits the generated glossy color information to the instruction unit 302.

In Step S44, the area acquisition unit 155 of the terminal device 30 acquires area information according to the user operation on the setting screen 400. Then, the area acquisition unit 155 transmits the acquired area information to the instruction unit 302.

In Step S45, the instruction unit 302 of the terminal device 30 receives the image from the image acquisition unit 301. The instruction unit 302 also receives the glossy color information from the color setting unit 154. Further, the instruction unit 302 receives the area information from the area acquisition unit 155. Subsequently, the instruction unit 302 transmits the image, the glossy color information, and the area information to the preview unit 157.

The preview unit 157 receives the image, the glossy color information, and the area information from the instruction unit 302.

Subsequently, a preview image is generated based on the image, the glossy color information, and the area information. Specifically, the preview unit 157 converts an image in the pseudo-clear area indicated by the area information, of the image received from the instruction unit 302, into the glossy color indicated by the glossy color information. Subsequently, the preview unit 157 generates screen data for displaying the preview screen 600 including the preview image. Then, the preview unit 157 causes the display 506 to display the preview screen 600 based on the screen data.

In Step S46, the instruction unit 302 of the terminal device 30 generates an image forming instruction based on the glossy color information and the area information. The instruction unit 302 generates the image forming instruction to form an image in the pseudo-clear area with a glossy color and form an image in the clear area with a transparent color. Then, the instruction unit 302 transmits the image forming instruction to the print control apparatus 20.

In Step S47, the instruction reception unit 201 of the print control apparatus 20 receives the image forming instruction from the terminal device 30. Subsequently, the instruction reception unit 201 generates an image forming job based on the received image forming instruction. Then, the instruction reception unit 201 stores the generated image forming job in the job storage unit 202.

In Step S48, the job transmission unit 203 of the print control apparatus 20 monitors the job execution status of the image forming apparatus 10, and when the job execution status indicates that a new image forming job is executable, reads one of the image forming jobs from the job storage unit 202. Then, the job transmission unit 203 transmits the read image forming job to the image forming apparatus 10.

In Step S49, the job reception unit 151 of the image forming apparatus 10 receives the image forming job from the print control apparatus 20. Subsequently, the job reception unit 151 receives the received image forming job. Then, the job reception unit 151 transmits the received image forming job to the image forming unit 156.

In Step S50, the image forming unit 156 of the image forming apparatus 10 forms an image on an image forming medium based on the image forming job. The image forming unit 156 forms an image in the pseudo-clear area with a glossy color, among images formed on the image forming medium. The image forming unit 156 forms an image in the clear area with a transparent color.

The terminal device 30 according to the present embodiment sets a glossy color for applying gloss to an image based on the surface color of an image forming medium on which the image is to be formed, and outputs an image forming instruction that instructs to form an image on the image forming medium with the glossy color. The image forming apparatus 10 forms an image on an image forming medium with the glossy color in accordance with an image forming job that is based on the image forming instruction output from the terminal device 30. According to the present embodiment, an image having high glossiness can be formed.

Examples of Application

The image forming system 1000 according to each of the above-described embodiments can be applied to the security field. For example, a printed material on which a glossy image is formed by the image forming system 1000 can be used to prevent unauthorized duplication.

For example, when tickets for a concert are printed, if an image partially provided with gloss is formed on the ticket, it is possible to distinguish between a genuine ticket and a ticket duplicated by a copier. This is because the copier does not detect, for example, gloss and shine, and therefore, the duplicated version does not reproduce the image with the applied gloss.

Figure 33:
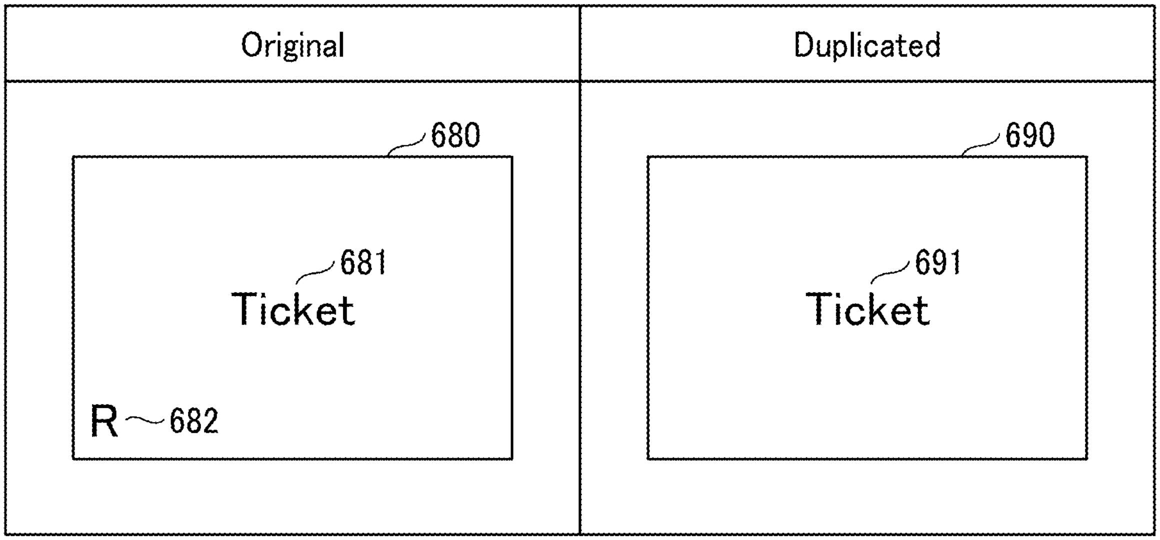
FIG. 33 is a diagram illustrating an example of a printed material applying an embodiment of the present disclosure.

FIG. 33 is a diagram illustrating an example of a printed material applying an embodiment of the present disclosure. FIG. 33 illustrates an example of an original ticket 680 on which an image is formed by the image forming system 1000 and an example of a duplicated ticket 690 obtained by duplicating the original ticket 680 by a copier.

On the original ticket 680, an image 681 to which no gloss is applied and a glossy image 682 that is an image to which gloss is applied are formed. An image 691 to which no gloss is applied is formed on the duplicated ticket 690. An image corresponding to the image 682 of the original ticket 680 is not formed on the duplicated ticket 690.

In the printed material on which the image is formed by the image forming system 1000, since the image and the surface color of the image forming medium have colors that are substantially the same, the colors blend together, causing the image to appear translucent. Accordingly, the security function or the authenticity identification function can be enhanced without impairing the design of the printed material.

Aspects of the present disclosure are, for example, as follows.

Aspect 1

An information processing apparatus includes a color acquisition unit to acquire color information indicating a surface color of an image forming medium. The information processing apparatus includes a color setting unit to set an image forming color for applying gloss to the image forming medium based on the color information. The information processing apparatus includes an output unit to output information instructing to form an image on the image-forming medium with the image forming color.

Aspect 2

The information processing apparatus of Aspect 1 includes a storage unit that stores the image forming color in association with the surface color. The color setting unit sets the image forming color by reading from the storage unit the image forming color corresponding to the surface color acquired by the color acquisition unit.

Aspect 3

In the information processing apparatus of Aspect 2, in a case where the image forming color corresponding to the surface color is not able to read from the storage unit, the color setting unit sets an image forming color having one or more components identical to the one or more components of the surface color, based on the surface color acquired by the color acquisition unit.

Aspect 4

In the information processing apparatus of any one of Aspect 1 to Aspect 3, the image forming color has one or more components identical to the one or more components of the surface color.

Aspect 5

In the information processing apparatus of Aspect 4, all the components of the image forming color are identical to the components of the surface color.

Aspect 6

In the information processing apparatus of Aspect 4, the image forming color is a color obtained by reducing a black component from the surface color.

Aspect 7

In the information processing apparatus of Aspect 6, the image forming color is a color obtained by removing a black component from the surface color.

Aspect 8

The information processing apparatus of any one of Aspect 1 to Aspect 7 further includes an area acquisition unit to acquire area information indicating an area to be applied with gloss on the image forming medium.

The output unit outputs information instructing to form the image in the area with the image forming color.

Aspect 9

In the information processing apparatus of Aspect 8, the area information includes a first area in which the image is formed with the image forming color and a second area in which the image is formed with a transparent color.

The output unit outputs information instructing to form the image with the image forming color in the first area and to form the image with the transparent color in the second area.

Aspect 10

In the information processing apparatus of any one of Aspect 1 to Aspect 9, the color acquisition unit acquires the color information indicating the surface color measured using a colorimeter.

Aspect 11

The information processing apparatus of any one of Aspect 1 to Aspect 10 further includes a display control unit to display a second image obtained by converting the image into the image forming color on a display.

Aspect 12

The information processing apparatus of any one of Aspect 1 to Aspect 10 further includes an image acquisition unit to acquire the image to be formed on the image forming medium, and a display control unit configured to display, on a display, a second image obtained by converting the image included in the area to be applied with gloss into the surface color or an approximate color of the surface color.

Aspect 13

The information processing apparatus of any one of Aspect 1 to Aspect 10 further includes a storage unit that stores a type of the image forming medium and the image forming color in association with each other, and a reception unit to receive a selection of the type of the image forming medium.

The color acquisition unit acquires the color information indicating the surface color associated with the type of the image forming medium selected by a user.

The color setting unit sets the image forming color corresponding to the color information in the storage unit as the image forming color.

Aspect 14

The information processing apparatus of any one of Aspect 1 to Aspect 10 further includes a storage unit that stores the surface color of the image forming medium and the image forming color in association with each other, and a reception unit to receive an input for the surface color of the image forming medium.

The color acquisition unit acquires the color information based on the surface color of the image forming medium input by a user.

The color setting unit sets the image forming color corresponding to the color information in the storage unit as the image forming color.

Aspect 15

The information processing apparatus of Aspect 12 further includes an output unit to output an image forming instruction including information instructing to apply gloss to the image forming medium included in the area.

Aspect 16

An information processing apparatus includes a color acquisition unit to acquire color information indicating a surface color of an image forming medium.

The information processing apparatus includes a color setting unit to set an image forming color for applying gloss to the image forming medium based on the color information.

The information processing apparatus includes an image forming unit to form an image on the image forming medium with the image forming color.

Aspect 17

An image forming system includes an image forming apparatus and an information processing apparatus that can communicate with each other via a network.

The information processing apparatus includes a color acquisition unit to acquire color information indicating a surface color of an image forming medium.

The information processing apparatus includes a color setting unit to set an image forming color for applying gloss to the image forming medium based on the color information.

The information processing apparatus includes an output unit to transmit an image forming instruction for forming an image on the image forming medium with the image forming color, to the image forming apparatus.

The image forming apparatus includes a job reception unit to receive a job based on the image forming instruction, and an image forming unit to form the image on the image forming medium with the image forming color based on the job.

Aspect 18

An information processing method performed by a computer.

The method includes acquiring color information indicating a surface color of an image forming medium.

The method includes setting an image forming color for applying gloss to the image forming medium based on the color information.

/The method includes outputting information instructing to form an image on the image forming medium with the image forming color.

Aspect 19

A program that causes a computer to execute a method.

The method includes acquiring color information indicating a surface color of an image forming medium. The method includes setting an image forming color for applying gloss to the image forming medium based on the color information. The method includes outputting information instructing to form an image on the image forming medium with the image forming color.

In the related art, sufficient glossiness may not be obtained. For example, when image forming is performed on a colored image forming medium using transparent toner, a cloudy image may be formed.

According to one or more embodiments of the present disclosure, an image having high glossiness can be formed.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application-specific integrated circuits (ASICs), field-programmable gate arrays (FPGAs), and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of an FPGA or ASIC.

The invention claimed is:

1. An information processing apparatus, comprising circuitry configured to:

acquire color information indicating a surface color of an image forming medium;

set, based on the acquired color information, an image forming color for applying gloss to the image forming medium; and output an instruction to form an image on the image forming medium with the image forming color.

2. The information processing apparatus of claim 1, further comprising a memory that stores one or more image forming colors including the image forming color and one or more surface colors including the surface color, each of the one or more image forming colors being associated with a corresponding one of the one or more surface colors, the image forming color being associated with the surface color, wherein the circuitry is further configured to read, from the memory, the image forming color associated with the surface color indicated by the acquired color information to set the image forming color.

3. The information processing apparatus of claim 2, wherein in a case that the circuitry fails to read the image forming color associated with the surface color from the memory, the circuitry sets, as the image forming color, a color having one or more components identical to one or more components of the surface color, based on the acquired color information.

4. The information processing apparatus of claim 1, wherein the image forming color has one or more components identical to one or more components of the surface color.

5. The information processing apparatus of claim 1, wherein the image forming color is composed of components identical to components of the surface color.

6. The information processing apparatus of claim 4, wherein the image forming color is a color obtained by reducing a black component from the surface color.

7. The information processing apparatus of claim 6, wherein the image forming color is a color obtained by removing the black component from the surface color.

8. The information processing apparatus of claim 1, wherein the circuitry is further configured to acquire area information indicating an area to be applied with gloss on the image forming medium, and the instruction indicates to form the image with the image forming color in the area.

9. The information processing apparatus of claim 8, wherein the image includes a first image and a second image, the area includes a first area and a second area, the first image being to be formed with the image forming color in the first area and the second image being to be formed with a transparent color in the second area, and the instruction indicates to form the first image with the image forming color in the first area and form the second image with the transparent color in the second area.

10. The information processing apparatus of claim 1, wherein the surface color indicated by the acquired color information is measured with a colorimeter.

11. The information processing apparatus of claim 1, wherein the circuitry is further configured to display, on a display, the image after converting a color of the image into the image forming color.

12. The information processing apparatus of claim 1, wherein the circuitry is further configured to acquire the image to be formed on the image forming medium; and display, on a display, the image after converting a color of the image in an area to be applied with gloss into one of the surface color or an approximate color of the surface color.

13. The information processing apparatus of claim 1, further comprising a memory that stores a type of the image forming medium in association with the image forming color, wherein the circuitry is configured to:

receive a user operation of selecting the type of the image forming medium;

acquire the color information indicating the surface color corresponding to the selected type of the image forming medium; and set, based on the acquired color information, the image forming color associated with the selected type of the image forming medium in the memory.

14. The information processing apparatus of claim 1, further comprising a memory that stores the surface color of the image forming medium in association with the image forming color, wherein the circuitry is configured to:

receive a user input for the surface color of the image forming medium;

acquire the color information based on the user input for the surface color of the image forming medium; and set, based on the acquired color information, the image forming color associated with the surface color in the memory.

15. The information processing apparatus of claim 12, wherein the instruction indicates to apply gloss to the image in the area on the image forming medium.

16. An information processing method, comprising:

acquiring color information indicating a surface color of an image forming medium;

setting an image forming color for applying gloss to the image forming medium based on the acquired color information; and outputting instruction to form an image on the image forming medium with the image forming color.

17. A non-transitory recording medium storing a plurality of instructions which, when executed by one or more processors, causes the processors to perform a method, the method comprising:

acquiring color information indicating a surface color of an image forming medium;

setting an image forming color for applying gloss to the image forming medium based on the acquired color information; and outputting instruction to form an image on the image forming medium with the image forming color.

* * * * *